(12) United States Patent
Varadarajan et al.

(10) Patent No.: US 11,176,487 B2
(45) Date of Patent: Nov. 16, 2021

(54) GRADIENT-BASED AUTO-TUNING FOR MACHINE LEARNING AND DEEP LEARNING MODELS

(71) Applicant: Oracle International Corporation, Redwood Shores, CA (US)

(72) Inventors: Venkatanathan Varadarajan, Austin, TX (US); Sam Idicula, Santa Clara, CA (US); Sandeep Agrawal, San Jose, CA (US); Nipun Agarwal, Saratoga, CA (US)

(73) Assignee: Oracle International Corporation, Redwood Shores (CA)

( * ) Notice: Subject to any disclaimer, the term of this patent is extended or adjusted under 35 U.S.C. 154(b) by 962 days.

(21) Appl. No.: 15/885,515

(22) Filed: Jan. 31, 2018

(65) Prior Publication Data

US 2019/0095818 A1    Mar. 28, 2019

Related U.S. Application Data

(60) Provisional application No. 62/565,009, filed on Sep. 28, 2017.

(51) Int. Cl.
*G06N 20/00* (2019.01)
*G06N 5/02* (2006.01)
(Continued)

(52) U.S. Cl.
CPC .............. *G06N 20/00* (2019.01); *G06N 5/022* (2013.01); *G06N 20/20* (2019.01); *G06N 3/04* (2013.01); *G06N 7/005* (2013.01); *G06N 20/10* (2019.01)

(58) Field of Classification Search
CPC ........ G06N 20/00; G06N 20/10; G06N 20/20; G06N 3/04; G06N 5/022; G06N 7/005
See application file for complete search history.

(56) References Cited

U.S. PATENT DOCUMENTS 9,009,687 B2    4/2015 Caira
10,489,215 B1   11/2019 Wen
(Continued)

FOREIGN PATENT DOCUMENTS

EP        3 101 599 A2    12/2016
WO    WO 2008/133509 A1   11/2008

OTHER PUBLICATIONS

Hsu et al., "A Practical Guide to Support Vector Classification", May 19, 2016, National Taiwan University, 2016, pp. 1-16 (Year: 2016).*

(Continued)

*Primary Examiner* — Ann J Lo
*Assistant Examiner* — Leonard A Sieger
(74) *Attorney, Agent, or Firm* — Hickman Becker Bingham Ledesma LLP

(57) ABSTRACT

Herein, horizontally scalable techniques efficiently configure machine learning algorithms for optimal accuracy and without informed inputs. In an embodiment, for each particular hyperparameter, and for each epoch, a computer processes the particular hyperparameter. An epoch explores one hyperparameter based on hyperparameter tuples. A respective score is calculated from each tuple. The tuple contains a distinct combination of values, each of which is contained in a value range of a distinct hyperparameter. All values of a tuple that belong to the particular hyperparameter are distinct. All values of a tuple that belong to other hyperparameters are held constant. The value range of the particular hyperparameter is narrowed based on an intersection point of a first line based on the scores and a second line based on the scores. A machine learning algorithm is optimally configured from repeatedly narrowed value ranges of hyperparameters. The configured algorithm is invoked to obtain a result.

44 Claims, 8 Drawing Sheets

(51) Int. Cl.
   *G06N 20/20* (2019.01)
   *G06N 3/04* (2006.01)
   *G06N 20/10* (2019.01)
   *G06N 7/00* (2006.01)

(56) References Cited

U.S. PATENT DOCUMENTS

| | | | |
|---|---|---|---|
| 10,554,738 | B1 | 2/2020 | Ren |
| 10,606,649 | B2 | 3/2020 | Baggerman |
| 10,832,087 | B1 | 11/2020 | Wang et al. |
| 2002/0169735 | A1 | 11/2002 | Kil et al. |
| 2014/0101117 | A1 | 4/2014 | Uzzaman |
| 2014/0344193 | A1 | 11/2014 | Bilenko et al. |
| 2017/0169360 | A1 | 6/2017 | Veeramachaneni et al. |
| 2018/0022539 | A1 | 1/2018 | Vedani |
| 2018/0060211 | A1 | 3/2018 | Allen |
| 2018/0060220 | A1 | 3/2018 | Yao |
| 2018/0144029 | A1 | 5/2018 | Cruanes |
| 2018/0225391 | A1 | 8/2018 | Sali et al. |
| 2019/0018614 | A1 | 1/2019 | Balko |
| 2019/0087529 | A1 | 3/2019 | Steingrimsson |
| 2019/0095756 | A1 | 3/2019 | Agrawal |
| 2019/0095785 | A1* | 3/2019 | Sarkar .................... G06N 20/00 |
| 2019/0095819 | A1 | 3/2019 | Varadarajan |
| 2019/0197357 | A1 | 6/2019 | Anderson |
| 2019/0244139 | A1 | 8/2019 | Varadarajan |
| 2019/0340095 | A1 | 11/2019 | Faibish |
| 2019/0392255 | A1 | 12/2019 | Franklin |
| 2020/0034197 | A1 | 1/2020 | Nagpal |
| 2020/0045049 | A1 | 2/2020 | Apostolopoulos |
| 2020/0076840 | A1 | 3/2020 | Peinador |
| 2020/0076841 | A1 | 3/2020 | Hajimirsadeghi |
| 2020/0076842 | A1 | 3/2020 | Zhou |
| 2020/0082013 | A1 | 3/2020 | Triplet et al. |
| 2020/0125545 | A1 | 4/2020 | Idicula |
| 2020/0125568 | A1 | 4/2020 | Idicula |
| 2020/0327448 | A1 | 10/2020 | Yakovlev |
| 2020/0334569 | A1 | 10/2020 | Moghadam |
| 2020/0342265 | A1 | 10/2020 | Cai |
| 2020/0364599 | A1 | 11/2020 | Ma |
| 2020/0380378 | A1 | 12/2020 | Moharrer |

OTHER PUBLICATIONS

Bergstra et al., "Random Search for Hyper-Parameter Optimization", 2012, Journal of Machine Learning Research, vol. 13 (2012), 281-305 (Year: 2012).*

Brochu et al., "A Tutorial on Bayesian Optimization of Expensive Cost Functions, with Application to Active User Modeling and Hierarchical Reinforcement Learning", Dec. 12, 2010, arXiv, v 1012.2599v1, pp. 1-49 (Year: 2010).*

Maclaurin et al., "Gradient-based Hyperparameter Optimization through Reversible Learning", 2015, Proceedings of the 32nd International Conference on Machine Learning, vol. 32 (2015), pp. 1-10 (Year: 2015).*

Peinador, U.S. Appl. No. 16/122,398, filed Sep. 5, 2018, Office Action, dated Oct. 28, 2020.

Idicula, U.S. Appl. No. 16/298,837, filed Mar. 11, 2019, Office Action, dated Sep. 3, 2020.

Weinberger et al., "Unsupervised learning of image manifolds by semidefinite programming", IEEE, dated Jun. 27, 2004, 10 pages.

Snoek, "Practical Bayesian Optimization of Machine Learning Algorithms", dated 2012, 9 pages.

Simpson et al., "Automatic Algorithm Selection in Computational Software Using Machine Learning", dated 2016, 10 pages.

Scikit Learn, "3.2. Tuning the hyper-parameters of an estimator", http://scikitlearn.org/stable/modules/grid_search.html, dated 2017, 6 pages.

Pinter, Janos, "Calibrating Artificial Neural Networks by Global Optimization", Technical Report, Özyeğin University, Istanbul Submitted for publication: Jul. 2010, 17 pages.

Kuck et al., "Meta-learning with neural networks and landmarking for forecasting model selection an empirical evaluation of different feature sets applied to industry data", dated Jul. 24-29, 2016, 8pgs.

Gonzalez et al., "Batch Bayesian Optimization via Local Penalization", Proceedings of the 19th International Conference on Artificial Intelligence and Stats JMLR: W&CP vol. 41, dated 2016, 10 pages.

Feurer et al. "Efficient and Robust Automated Machine Learning", dated 2015, 9 pages.

Doan et al., "Selecting Machine Learning Algorithms using Regression Models", https://www.researchgate.net/publication/304298580, dated Nov. 2015, 8 pages.

Doan et al., "Algorithm Selection Using Performance and Run Time Behavior", Chapter, Artificial Intelligence: Methodology, Systems and Applicationsm AIMSA dated Sep. 2016, pp. 3-13.

Bergstra et al., "Random Search for Hyper-Parameter Optimization", Journal of Machine Learning Research 13 (2012) 281-305, dated Feb. 2012, 25 pages.

Bergstra et al., "Making a Science of Model Search: Hyperparameter Optimization in Hundreds of Dimensions for Vision Architectures", JMLR: W &CP, vol. 28, dated 2013, 9 pages.

Bergstra et al., "Hyperparameter Optimization and Boosting for Classifying Facial Expressions: How good can a "Null" Model be?", ICML Workshop on Representation and Learning, dated 2013, 7 pages.

Bergstra et al., "Hyperopt: A Python Library for Optimizing the Hyperparameters of Machine Learning Algorithms", Proc. of the 12th Python in Science Conf. (SCIPY 2013), dated 2013, 8 pages.

Andrychowicz et al., "Learning to learn by gradient descent by gradient descent", 30th Conference on Neural Information Processing Systems dated (NIPS 2016), Barcelona, Spain, 9 pages.

Yogatama et al., "Efficient Transfer Learning Method for Automatic Hyperparameter Tuning", Proceedings of the 17th International Conference on Artifical Intelligence and Statistics dated 2014, 9 pages.

Swersky et al., "Multi-Task Bayesian Optimization", dated 2013, 9 pages.

Kim et al., "Learning to Transfer Initializations for Bayesian Hyperparameter Optimization", 31st Conference on Neural Information Processing Systems dated 2017, Long Beach, CA, USA, 5 pages.

Feurer et al., "Using Meta-Learning to Initialize Bayesian Optimization of Hyperparameters", dated 2014, 8 pages.

Feurer et al., "Initializing Bayesian Hyperparameter Optimization via Meta-Learning", dated 2015, 8 pages.

Bardenet et al., "Collaborative hyperparameter tuning", Proceedings of the 30 th International Conference on Machine Learning, Atlanta, Georgia, USA, 2013, 9 pages.

Lin et al., "Experiencing SAX: a novel symbolic representation of time series", dated Apr. 3, 2007, 38 pages.

Abe et al., "Developing an Integrated Time-Series Data Mining Environment for Medical Data Mining", Seventh IEEE International Conference on Data Mining—Workshops, dated 2007, 6 pages.

Ahmed et al., "An Empirical Comparison of Machine Learning Models for Time Series Forecasting", dated Sep. 15, 2010, 31 pages.

Amazon SageMaker, "DeepAR Forecasting Algorithm", https://docs.aws.amazon.com/sagemaker/latest/dg/deepar.html,last viewed on Jun. 29, 2020, 5 pages.

Artificial Intelligence Blog, "Announcing automated ML capability in Azure Machine Learning", dated Sep. 24, 2018, 8 pages.

Brownlee, Jason, "Time Series Forecasting as Supervised Learning", dated Aug. 21, 2019, 2 pages.

Camerra et al., "Beyond one billion time series: indexing and mining very large time series collections with iSAX2+", dated Feb. 16, 2013, 29 pages.

"Machine Learning Approaches for Time Series Data" dated May 19, 2019, 25 pages.

Kraska, Tim, "Northstar: An Interactive Data Science System", Proceedings of the VLDB Endowment, vol. 11, No. 12 Copyright 2018 VLDB Endowment, 15 pages.

(56) References Cited

OTHER PUBLICATIONS

Wang et al., "Experimental comparison of representation methods and distance measures for time series data", dated Feb. 12, 2010, 35 pages.
Ng, "Data preprocessing for machine learning: options and recommendations", dated Jun. 22, 2020, 12 pages.
Olson et al., "Evaluation of a Tree-based Pipeline Optimization Tool for Automating Data Science", dated Mar. 20, 2016, 8 pages.
Oracle, "The Oracle AutoML Pipeline" Four Main Stages, https://docs.cloud.oracle.com/en-US/iaas/tools/ads-sdk/latest/user_guide/automl/overview.html, dated Apr. 28, 2020 or later, 4 pages.
Paoli et al., "Forecasting of preprocessed daily solar radiation time series using neural networks", Solar Energy, Elsevier, dated 2010, 43 pages.
Plotz et al., "Feature Learning for Activity Recognition in Ubiquitous Computing", dated Jan. 2011, 7 pages.
Schoenfeld et al., "Preprocessor Selection for Machine Learning Pipelines", dated 2018, 7 pages.
Song et al., "Deep r-th Root of Rank Supervised Joint Binary Embedding for Multivariate Time Series Retrieval", KDD 2018, dated Aug. 19-23, 2018, London, United Kingdom, 10 pages.
Faloutsos et al., "Fast Subsequence Matching in Time Series Databases", dated 1998, 11 pages.
Zhen Hua Liu et al. "JSON Data Management in RDBMS", Emerging Technologies and Applications in Data Processing and Management, dated May 13, 2019, pp. 20-45.
USPTO, "Public Views on Artificial Intelligence and Intellectual Property Policy", dated Oct. 2020, 56 pages.
Knut Anders Hatlen, "Partial Update of JSON Values", MySQL Server Blog, dated Apr. 3, 2018, 6 pages.
Bryan P et al., "JavaScript Object Notation (JSON) Patch; rfc6902.txt", Javascript Object Notation (JSON) Patch, Internet Engineering Task Force, Standard, Internet Society, Apr. 3, 2013, 18 pages.
Mirza Ali H et al., "Computer Network Intrusion Detection Using Sequwnrial LSTM Neural Networks Autoencoders", dated May 2, 2018, 2018 26th Signal Processing and Communicaitons Applications Con. 4 pgs.
Loganathan Gobinath et al., "Sequence to Sequence Pattern Learning Algorithm for Real-Time Anomaly Detection in Network Traffic", dated 2018 IEEE, dated May 13, 2018, pp. 1-4.
Maclaurin et al., "Gradient-based Hyperparameter Optimization through Reversible Learning", Proceedings of the 32nd International Conference on Machine Learning, Lille, France, dated 2015, 10 pages.
Gonzalez et al., "Batch Bayesian Optimization via Local Penalization", Proceedings of the 19th International Conference on Artificial Intelligence and Statistics, dated 2016, 10 pages.
Kiros et al., "Skip-Thought Vectors", dated 2015, 9 pages.
Kingma et al., "ADAM: A Method for Stochastic Optimization", Published as a conference paper at ICLR 2015, dated Jan. 1, 2017, 15 pages.
Kim, Yongjoon, "Chapter 10, Sequence Modeling: Recurrent and Recursive Nets", dated Apr. 1, 2016, 50 pages.
Karpathy et al., "Deep Visual-Semantic Alignments for Generating Image Descriptions", dated 2015, 10 pages.
Hutter et al., "Sequential Model-Based Optimization for General Algorithm Configuration", dated 2011, 15 pages.
Huang et al., "Online System Problem Detection by Mining Patterns of Console Logs", dated Dec. 2009, 11 pages.
Hochreiter, Sepp, "Long Short Term Memory", Nural Computation, dated Nov. 15, 1997, 46 pages.
Hinton et al., "NeuralNetworks for Machine Learning", Lecture Overviewof mini-batch gradient descent, dated 2012, 31 pages.
Hill et al., "Learning Distributed Representations of Sentences from Unlabelled Data", dated Feb. 10, 2016, 11 pages.
Hamilton et al., "Representation Learning on Graphs: Methods and Applications", Copyright 2017 IEEE, 24 pages.
Hamilton et al., "Inductive Representation Learning on Large Graphs", 31st Conference on Neural Information Processing Systems (NIPS 2017), Long Beach, CA, USA, 11 pages.

Haider et al., "Generating Realistic Intrusion Detection System Dataset Based on Fuzzy Qualitative Modeling", Journal of Network and Computer Applications 87 (2017) 8 pages.
HaddadPajouh et al., "A Two-layer Dimension Reduction and Two-tier Classification Model for Anomaly-Based Intrusion Detection in IoT Backbone Networks", dated 2016, 12 pages.
Aggarwal et al., "Analysis of KDD Dataset Attributes—Class wise For Intrusion Detection", 3rd International Conference on Recent Trends in Computing 2015, 10 pages.
Ding et al., "PCA-Based Network Traffic Anomaly Detection" Tsinghua Science and Technology, vol. 21, No. 5, Oct. 2016, 10 pages.
Bengio et al., "A Neural Probabilistic Language Model", Journal of Machine Learning Research 3, dated Feb. 2003, 19 pages.
Bengio et al., "Learning Deep Architectures for AI", dated 2009, 71 pages.
Berlin et al., "Malicious Behavior Detection using Windows Audit Logs", dated Aug. 25, 2015, 10 pages.
Bontemps et al., "Collective Anomaly Detection based on Long Short Term Memory Recurrent Neural Network", dated 2016, 12 pages.
Buczak et al., "A Survey of Data Mining and Machine Learning Methods for Cyber Security Intrusion Detection", IEEE Communications Surveys & Tutorials, vol. 18, No. 2, Second Quarter 2016, 24 pages.
Grover et al., "node2vec: Scalable Feature Learning for Networks", KDD '16, Aug. 13-17, 2016, San Francisco, CA, USA, 10 pages.
Dai et al., "Semi-supervised Sequence Learning", dated 2015, 9 pages.
Graves et al., "Speech Recognition With Deep Recurrent Neural Networks", dated Mar. 22, 2013, 5 pages.
Du et al. DeepLog: Anomaly Detection and Diagnosis from System Logs through Deep Learning, CCS'17, Oct. 30-Nov. 3, 2017, 14 pages.
Garcia-Duran et al. "Learning Graph Representations with Embedding Propagation", 31st Conference on Neural Information Processing Systems (NIPS 2017), 12 pages.
Ghosh et al., "Detecting Anomalous and Unknown Intrusions Against Programs", dated 1998, 9 pages.
Gibert et al., "Graph Embedding in Vector Spaces", GbR'2011 Mini-tutorial, dated 2011, 66 pages.
Gogoi, et al., "Packet and Flow Based Network Intrusion Dataset", dated 2012, 12 pages.
Kolosnjaji et al., "Deep Learning for Classification of Malware System Call Sequences", dated 2016, 12 pages.
Conneau et al. "Supervised Learning of Universal Sentence Representations from Natural Language Inference Data", Dated Jul. 21, 2017, 12 pages.
Wei et al., "Graph embedding based feature selection", Neurocomputing 93 dated May 17, 2012, 11 pages.
Klapper-Rybicka et al., "Unsupervised Learning in Recurrent Neural Networks", dated May 1, 2001, 11 pages.
Shiravi et al., "Toward Developing a Systematic Approach to Generate Benchmark Datasets for Intrusion Detection", dated Feb. 28, 2011, 18 pages.
Snoek et al., "Input Warping for Bayesian Optimization of Non-Stationary Functions", Proceedings of the 31 st International Conference on Machine Learning, Beijing, China, 2014, 9 pages.
Snoek et al., "Scalable Bayesian Optimization Using Deep Neural Networks", dated 2014, 10 pages.
Sutskever et al., "Sequence to Sequence Learning with Neural Networks", dated 2014, 9 pages.
Seleznyov et al., "Anomaly Intrusion Detection Systems: Handling Temporal Relations between Events", dated 1999, 12 pages.
Usama et al., "Unsupervised Machine Learning for Networking: Techniques, Applications and Research Challenges", dated Sep. 19, 2017, 37 pages.
Scholkopf et al. "Estimating the Support of a High-Dimensional Distribution", dated Nov. 27, 1999, 28 pages.
Xu et al. "Detecting Large-Scale System Problemd by Mining Console Logs", SOSP'09, Oct. 11-14, 2009, 15 pages.

(56) References Cited

OTHER PUBLICATIONS

Yamanishi et al., "Dynamic Syslog Mining for Network Failure Monitoring", KDD'05, Aug. 21-24, 2005, Chicago, Illinois, USA, 10 pages.
Yen et al., "Beehive: Large-Scale Log Analysis for Detecting Suspicious Activity in Enterprise Networks", ACSAC '13 dated Dec. 9-13, 2013, New Orleans, Louisiana, USA, 10 pages.
Yousefi-Azar et al., "Autoencoder-based Feature Learning for Cyber Security Applications", dated 2017, 8 pages.
YuanZhong, Zhu, "Intrusion Detection Method based on Improved BP Neural Network Research", International Journal of Security and its Applications vol. 10, No. 5 (2016) pp. 193-202.
Zhang et al., "Network Anomaly Detection Using One Class Support Vector Machine", Proceedings of the International MultiConference of Engineers and Computer Scientists 2008 vol. I, Mar. 19, 2008, 5 pages.
Tuor et al., "Deep Learning for Unsupervised Insider Threat Detection in Structured Cybersecurity Data Streams", dated Dec. 15, 2017, 9 pages.
Malhotra et al., "LSTM-based Encoder-Decoder for Multi-sensor Anomaly Detection", Presented at ICML 2016 Anomaly Detection Workshop, New York, NY, USA, 2016. Copyright 2016—5 pages.
Zhang et al., "Automated IT System Failure Prediction: A Deep Learning Approach", dated 2016, 11 pages.
Le et al., "Distributed Representations of Sentences and Documents", Proceedings of the 31 st International Conference on Machine Learning, Beijing, China, dated 2014, 9 pages.
Liu et al., "Detecting and Preventing Cyber Insider Threats: A Survey", IEEE Communications Survey & Tutorials, dated 2018, 21 pages.
Liu et al., "Isolation Forest", dated 2008, 10 pages.
Luo et al., "A Revisit of Sparse Coding Based Anomaly Detection in Stacked RNN Framework", dated Oct. 2017, 9 pages.
Shipmon et al., "Time Series Anomaly Detection", Detection of Anomalous Drops with Limited Features and Sparse Examples in Noisy Highly Periodic Data, dated 2017, 9 pages.
Malhotra et al., "Long Short Term Memory Networks for Anomaly Detection in Time Series", ESANN dated Apr. 22, 2015 proceedings, European Symposium on Artificial Neural Networks, 6 pages.
Klapper-Rybicka et al., "Unupervised Learning in LSTM Recurrent Neural Networks", dated 2001, 8 pages.
Mikolov et al., "Distributed Representations of Words and Phrases and their Compositionality", dated 2013, 9 pages.
Mikolov et al., "Efficient Estimation of Word Representations in Vector Space", dated Sep. 7, 2013, 12 pages.
Mikolov, Tomas, "Recurrent Neural Network Based Language Model", dated Jul. 20, 2010, 24 pages.
Mnih et al., "A Scalable Hierarchical Distributed Language Model", dated 2009, 8 pages.
Perozzi et al., "DeepWalk: Online Learning of Social Representations", dated 2014, 10 pages.
Ruder, Sebastian, "An Overview of Gradient Descent Optimization Algorithms", dated Jun. 15, 2017, 14 pages.
Maglaras et al. "A real time OCSVM Intrusion Detection module with low overhead for SCADA systems", International Journal of Advanced Research in Artificial Intelligence, vol. 3, No. 10, 2014, 9 pgs.
Reif et al., "Prediction of Classifier Training Time including Parameter Optimization", dated Oct. 2011, 13 pages.
Peskov'a et al., "Hybrid Multi-Agent System for Metalearning in Data Mining", dated Sep. 19, 2014, 2 pages.
Lindne et al., "AST: Support for Algorithm Selection with a CBR Approach", Springer-Verlag Berlin Heidelberg 1999, 6 pages.
Lim et al., "A Comparison of Prediction Accuracy, Complexity, and Training Time of Thirty-Three Old and New Classification Algorithms", dated 2000, 26 pages.
Lemke et al., "Metalearning: a survey of trends and technologies", Artif Intell Rev dated 2015,14 pages.
Furnkranz et al., "An Evaluation of Landmarking Variants", dated 2001, 12 pages.
Filchenkjov et al., "Datasets Meta-Feature Description for Recommending Feature Selection Algorithm", dated Nov. 2015, 9 pages.
Feurer et al., "Initializing Bayesian Hyperparameter Optimization via Meta-Learning", Proceedings of the Twenty-Ninth AAAI Conference on Artificial Intelligence dated 2015, 8 pages.
Castiello et al., "Meta-data: Characterization of Input Features for Meta-learning", Springer-Verlag Berlin Heidelberg dated 2005, 13 pages.
Brazdil, Pavel, "Metalearning and Algorithm Selection: Progress, State of the Art and Introduction of the 2018 Special Issue", dated Dec. 2017, 23 pages.
Brazdil et al., "Ranking Learning Algorithms: Using IBL and Meta-Learning on Accuracy and Time Results", dated 2003 Kluwer Academic Publishers. Manufactured in The Netherlands, 27 pages.
Bensusan et al., "Discovering Task Neighbourhoods through Landmark Learning Performances", Springer-Verlag Berlin Heidelberg dated 2000, 6 pages.
Bensusan et al., "Casa Batlo is in Passeig de Gracia or how landmark performances can describe tasks", dated 2000, 19 pages.
Xin, Guo "A New Approach Towards the Combined Algorithm Selection and Hyper-parameter Optimization Problem", dated Jan. 28, 2019, 57 pages.
Trond et al., "Impact of Training Dataset Size on Neural Answer Selection Models" ROBOCUP 2008, dated Apr. 7, 2019, pp. 828-835.
Thornton et al., "Auto-WEKA: Combined Selection and Hyperparameter Optimization of Classification Algorithms", New York, New York, dated Mar. 6, 2013, 9 pages.
Petrak et al., "On the Use of Fast Subsampling Estimates for Algotithm Recommendation", dated Nov. 1, 2020, 10 pages.
Jomaa et al., "Dataset2Vec: Learning Dataset Meta-Features", dated May 5, 2019, 20 pages.
Hutter et al., "Sequential Model-Based Optimization for General Algorithm Configuration", Conference on the Theory and Applications of Cryptographic Techniques, dated Jan. 17, 2011. 17 pages.
Huang et al., "ABC: Efficient Selection of Machine Learning Configuration on Large Dataset", ARXIV.org, Cornell University Library, dated Nov. 8, 2018, 12 pages.
G.H John et al., "Static Versus Dynamic Sampling for Data Mining" KDD-96 Proceedings, dated Dec. 31, 1996, 4 pages.
Francois Portet et al., "Reduction of Lage Traning Set by Guided Progressive Sampling: Application to Neonatal Intensive Care Data", dated Jan. 1, 2001, 2 pages.
Foster Provost et al., "Efficient Progressive Sampling", Proceedings/ KDD-99, The fifth ACM Sigkdd International Conference on Knowledge Discovery and Data Mining, dated Aug. 1, 1999, pp. 23-32.
Figueroa et al., "Predicting Sample Size Required for Classification Performace", BMC Medical Informatics and Decision Making, Biomed Central, vol. 12 No. 1, dated Feb. 15, 2012, 10 pages.
An et al., "Variational Autoencoder based Anomaly Detection using Reconstruction Probability", 2015-2 Special Lecture on IE, dated Dec. 27, 2015, 18 pages.
Mendes-Moreira et al., "Ensemble Approaches for Regression", ACM Computing Surveys, ACM, New York, NY vol. 45, No. 1, dated Dec. 7, 2012, pp. 1-40.
B. Debnath et al., SARD: A statistical approach for ranking database tuning parameters. In ICDEW, pp. 11-18, dated 2008, 8 pages.
Caruana et al., "Ensemble Selection From Libraries of Models", Proceedings, Twenty-First International Conference on Machine Learning: dated Jul. 2004, 8 pages.
Chen Chi-Ou et al., "Machine Learning-Based Configuration Parameter Tuning on Hadoop System", dated Jun. 27, 2015, IEEE, pp. 386-392.
Duan et al., "Tuning Database Configuration Parameters with iTuned", VLDB dated 2009, 12 pages.
Ganapathi, A. et al. "Predicting multiple performance metrics for queries: Better decisions enabled by machine learning", ICDE 2009, 12 pages.
Gonnet et al., Automatic Problem-Specific Hyperparameter Optimization and Model Selection for Supervised Machine Learning, Technical Report, dated Jan. 1, 2015, 54 pages.
Aldave et al., "Systematic Ensemble Learning fro Regression" dated Mar. 28, 2014, pp. 1-38.

(56) References Cited

OTHER PUBLICATIONS

Jennie Duggan et al., "Modeling and Prediction of Concurrent Query Performance". SIGMOD, dated 2011, 12 pages.

Zilio, D.C.A. "DB2 design advisor: integrated automatic physical database design" VLDB dated 2004, Proceedings of the Thirtieth international conference on Very large data bases, 11 pages.

Narayanan et al., "Continuous resource monitoring for self-predicting DBMS", IEEE International Symposium on Modeling, Analysis and Simulation of Computer and Telecommunication Systems, 2005, 10 pages.

Nelder et al., "A Simplex Method for Function Minimization", The Computer Journal, vol. 7, dated Apr. 1, 1964, pp. 308-313.

Pedregosa, Fabian, "Hyperparameter Optimization with Approximate Gradient", Proceedings of the 33rd International Conference on Machinelearning, New York, vol. 48, dated Jun. 26, 2016, pp. 1-15.

Reif et al., "Meta-learning for evolutionary parameter optimization of classifiers, Machine Learning", dated 2012, 24 pages.

Sullivan et al., "Using probabilistic reasoning to automate software tuning", In SIGMETRICS, dated 2004, 13 pages.

Van Aken et al., "Automatic Database Management System Tuning Through Large-scale Machine Learning," Proceedings of the 2017 ACM International Conference on Management of Data, 2017, pp. 1009-1024.

J.D Wichard, "Model Selection in an Ensemble Framework", The 2013 International Joint Conference on Neural Networks, dated Jan. 1, 2006, pp. 2187-2192.

\* cited by examiner

GRADIENT-BASED AUTO-TUNING FOR MACHINE LEARNING AND DEEP LEARNING MODELS

BENEFIT CLAIM

This application claims the benefit under 35 U.S.C. § 119(e) of provisional application 62/565,009, filed Sep. 28, 2017, the entire contents of which is hereby incorporated by reference for all purposes as if fully set forth herein.

FIELD OF THE DISCLOSURE

This disclosure relates to machine learning. Presented herein are horizontally scalable techniques for efficient configuration of machine learning algorithms for optimal accuracy and without needing informed inputs.

BACKGROUND

Although application of machine learning (ML) is becoming ubiquitous, data science expertise likely will remain scarce. Relying on data scientists may not be sustainable or scalable, such as for large corporate vendors and their enterprise customers.

ML modeling involves:

Picking an appropriate model.

Tuning the model to a given dataset, which is the most time consuming and ad-hoc chore that heavily relies on data scientist expertise.

Model tuning is laborious for the following reasons. A large number of hyperparameters may be involved, especially for deep neural network models such as a multi-layer perceptron (MLP) or a convolutional neural network (CNN) that have many parameters such as a number of layers or a number of neurons.

Perhaps more importantly, a hyperparameter may have a wide range of possible values. The choice of actual values may significantly impact model performance, such as measured prediction accuracy. Unfortunately, hyperparameter value selection is often ad-hoc and greatly dependent on data scientist experience.

Training time of a model often is long, and tuning requires re-training models and evaluating them several times per tuning session. Given these challenges, industry sought efficiency by automatically tuning ML models for a given dataset and a given ML algorithm, such as a neural network or a support vector machine (SVM). A widely used method is exhaustive grid search, where all combinations of possible values for each hyperparameter are tried, and the best hyperparameter combination is used.

Another popular method is Bayesian optimization. Typically, Bayesian optimization is given a prior distribution for each hyperparameter. The optimization process initially chooses hyperparameter values based on that distribution and measures the performance of the model. Subsequently, based on observed performance of hyperparameter values tried, a next best value to explore is chosen based on the Bayesian probability, hopefully for optimal model performance, and perhaps indicated by an objective function. Unfortunately many of these hyperparameter tuning (or auto-tuning) approaches have one or more of the following deficiencies:

Bayesian optimization needs informed inputs. Typically, detailed parameter distribution information is needed for better model performance.

Bayesian optimization is inherently sequential and difficult to parallelize in meaningful ways.

Bayesian optimization applications are domain specific. Objective functions typically are not generic and do not readily generalize to large classes of datasets and ML and deep learning models.

Other alternative ways to optimize hyperparameters include random search, where a given statistical distribution for each hyperparameter is used to search during a chosen number of maximum trials. Both Bayesian optimization and random search need detailed inputs and typically do not guarantee finding a best combination of values. Although state of the art, Bayesian optimization is slow and potentially inaccurate, even with best of breed solutions such as the GpyOpt Python library.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer
   2.1 Machine Learning Algorithms
   2.2 Meta-Models
   2.3 Hyperparameters
   2.4 Value Range 2.5 Hyperparameter Tuple
2.6 Configuration and Training
2.7 Exploration
2.8 Narrowing
2.9 Epoch
2.10 Tuple Generation
2.11 Score
3.0 Gradient Search Space Reduction
    3.1 Curve Sampling
    3.2 Gradient Detection
    3.3 Peak Approximation
    3.4 Range Narrowing
    3.5 Next Epoch
    3.6 Result
4.0 Example Optimization Process
    4.1 Initialization
    4.2 Exploration
    4.3 Epoch Sequencing
    4.4 Hill Climb After Epoch Sequence
    4.5 Final Configuration
5.0 Tracking Best Scores
    5.1 Best Combination
    5.2 Categorical Hyperparameter
    5.3 Re-visitation
6.0 Categorical Optimization
    6.1 Categorical Combinatorics
7.0 Horizontal Scaling
    7.1 Multiprocessing
    7.2 Concurrency
    7.3 Load Balancing
    7.4 Synchronization
    7.5 Cross Validation
8.0 Hardware Overview
9.0 Software Overview
10.0 Cloud Computing General Overview Horizontally scalable techniques are provided herein for efficient configuration of machine learning algorithms for optimal accuracy and without needing informed inputs. In an embodiment, for each particular hyperparameter that is not a categorical hyperparameter, and for each epoch in a sequence of epochs, a computer processes the particular hyperparameter as follows. An epoch explores one hyperparameter based on computer-generated hyperparameter tuples. For each tuple, a score is calculated based on that tuple.

The hyperparameter tuple contains a distinct combination of values, each of which is contained in a current value range of a distinct hyperparameter. All values of hyperparameter tuples that belong to the particular hyperparameter are distinct. All values of a hyperparameter tuple that belong to any other hyperparameter are held constant during an epoch, such as the best value for that other hyperparameter so far. The computer narrows the current value range of the particular hyperparameter based on an intersection point of a first line that is based on the scores and a second line that is based on the scores.

A machine learning algorithm is optimally configured based on repeatedly narrowed value ranges of hyperparameters. The configured algorithm is invoked to obtain a result, such as recognition of a pattern or classification between multiple possible patterns.

2.0 Example Computer

Figure 1:
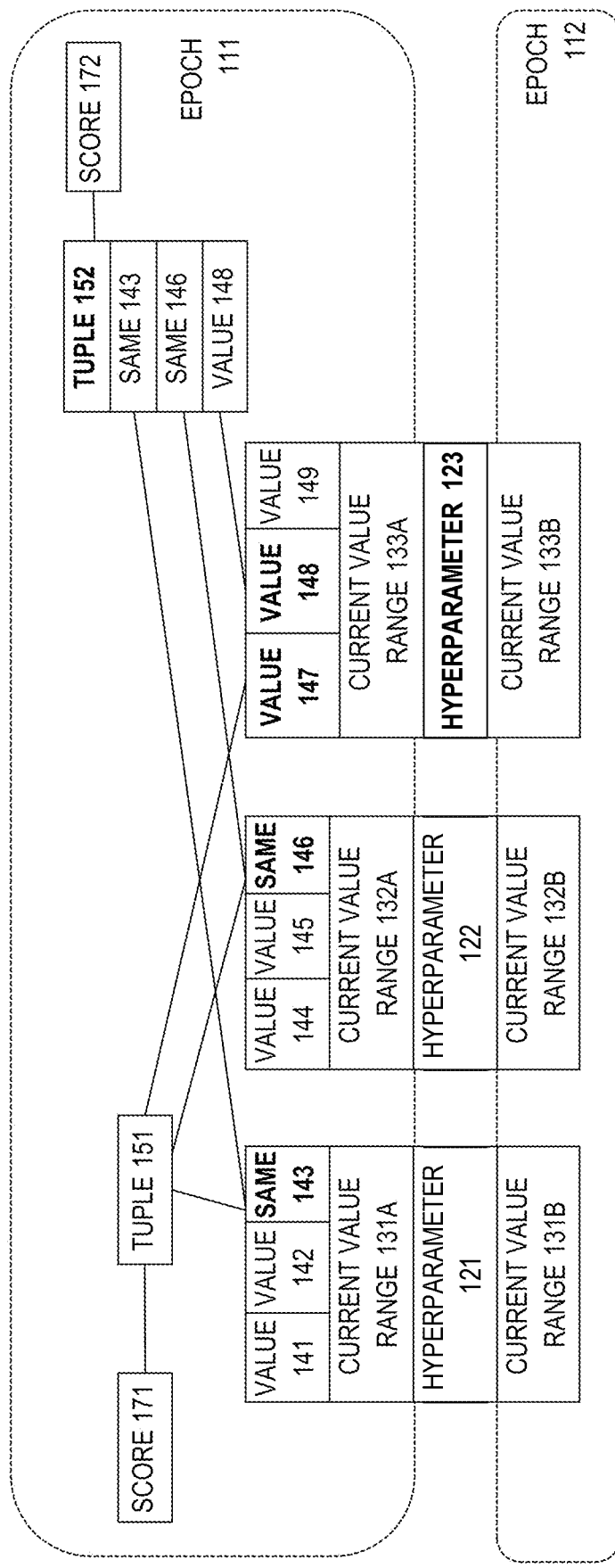
FIG. 1 is a block diagram that depicts an example computer that repeatedly narrows value ranges of hyperparameters of a machine learning algorithm to discover hyperparameter values that are optimal for configuring the algorithm for training, in an embodiment.

FIG. 1 is a block diagram that depicts an example computer 100, in an embodiment. Computer 100 repeatedly narrows value ranges of hyperparameters of a machine learning algorithm to discover hyperparameter values that are optimal for configuring the algorithm for training. Computer 100 may be one or more computers such as an embedded computer, a personal computer, a rack server such as a blade, a mainframe, a virtual machine, or any computing device that uses scratch memory during numeric and symbolic processing.

2.1 Machine Learning Algorithms

Computer 100 contains or accesses a specification (not shown) of a configurable and trainable machine learning algorithm that may perform analysis such as classification, regression, clustering, or anomaly detection. For example, the machine learning algorithm may be a support vector machine (SVM), an artificial neural network (ANN), a decision tree, or a random forest.

2.3 Hyperparameters

Configurable features of the machine learning algorithm are referred to as hyperparameters. For example, the machine learning algorithm has hyperparameters 121-123, which may be peculiar to the particular machine learning algorithm.

If the machine learning algorithm is a support vector machine, then hyperparameters typically include C and gamma. If the machine learning algorithm is a neural network, then hyperparameters may include features such as a count of layers and/or a count of neurons per layer.

2.4 Value Range

Each hyperparameter has its own natural range of values. For example, a count of neural layers may be an integer that ranges from three to ten.

Depending on the hyperparameter, the range of possible values may be numeric, such as integer or real. Some value ranges may be categorical and limited to discrete symbolic (i.e. non-numeric) values, such as labels or literals that have no relative ordering. Categorical hyperparameters may need special processing as discussed later herein.

2.5 Hyperparameter Tuple

The machine learning algorithm may have many configuration alternatives based on combinations of hyperparameter values. Each value combination may be represented as a configuration tuple. For example, each distinct configuration of the machine learning algorithm is based on a tuple of distinct values for hyperparameters 121-123, such as tuples 151-152.

Each of hyperparameters 121-123 may logically be a separate axis/dimension in a multidimensional hyperspace (not shown). Each distinct configuration of the machine learning algorithm is represented by a distinct tuple, such as 151, that corresponds to a distinct point in that hyperspace.

2.6 Configuration and Training

Computer 100 may use one tuple to configure and train the machine learning algorithm and then repeat with a slightly different tuple to detect a possible improvement of the performance of the algorithm. By repeated refinement of tuples and retraining, an optimal configuration tuple may be discovered.

Training the machine learning algorithm is computationally very expensive, which may be aggravated by the amount of raw data in a training dataset (not shown), the amount of hyperparameters such as 121-123, or the amount of values in the range of values of a hyperparameter such as 121.

2.7 Exploration

Some of hyperparameters 121-123 may be continuous variables, meaning that even a tiny subrange of such a hyperparameter may contain an infinite amount of points. Due to such intractable combinatorics, computer 100 should not use many or most of the points in the hyperspace for configuring the machine learning algorithm.

Computer 100 may efficiently explore and narrow the hyperspace to find which configuration alternatives of the machine learning algorithm would yield the best training results. During operation, exploring the hyperspace entails intelligently refining existing tuples to generate new tuples.

2.8 Narrowing

Narrowing the hyperspace entails using the new tuples to configure the algorithm, train the configured algorithm, and record performance metric(s) of the training, such as how much accuracy the trained algorithm achieves or how much time elapsed during training. Narrowing entails reducing a rang of possible values for each hyperparameters.

For example, hyperparameters 121-123 may respectively have current value ranges 131A, 132A, and 133A that are narrowed to achieve respective current value ranges 131B, 132B, and 133B. Within a current value range, such as 131A, may be many or an infinite amount of values, such as 141-143, depending on the type of hyperparameter 121.

A tuple, such as 151-152, has one value for each hyperparameter 121-123. For example, tuple 152 has values 143, 146, and 148 that fit within respective current value ranges 131A, 132A, and 133A.

2.9 Epoch

Most possible tuples are never generated, and those tuples that are generated are not all generated at the same time. For example, tuples such as 151-152 are generated and tested during epoch 111, while other tuples (not shown) are generated during other epochs such as 112.

Epochs are phases that logically occur in sequence. In an embodiment, epochs also occur in a strict temporal sequence, such that epoch 112 cannot begin until epoch 111 finishes.

In an embodiment, each hyperparameter has its own more or less independent sequence of epochs, such that hyperparameter 121 may have progressed through many epochs, while hyperparameter 122 is still in its first epoch. In an embodiment, all hyperparameters share a same sequence of epochs.

2.10 Tuple Generation

When a given hyperparameter has its own sequence of epochs, all of the tuples generated during the epoch have identical values for all of the hyperparameters, except for the values for the given hyperparameter. For example as shown, the given hyperparameter is 123, which is the only hyperparameter that is explored during that epoch.

For example, tuples 151-152 share same values 143 and 146 for respective hyperparameters 121-122. Although values 143 and 146 are held constant while exploring given hyperparameter 123 during epoch 111, value 143 may be a different constant than value 146, or even a different type (of number). Heuristics for selecting constants for these other (i.e. not explored) hyperparameters are discussed later herein.

Whereas, tuple 152 has value 148 for hyperparameter 123, and tuple 151 has different value 147 for hyperparameter 123. Heuristics for varying the values of the hyperparameter being explored are discussed later herein. Exploration of other hyperparameters entails generation of tuples in a similar way.

2.11 Score

Each generated tuple is tested by using it to configure the machine learning algorithm, training the configured algorithm, and measuring the performance of the algorithm during or after training to score the tuple. For example, tuples 151-152 have respective scores 171-172.

Depending on the embodiment, scores 171-172 may be a fitness score such as a classification score, an F1 score, a score based on a loss metric, or a function of some or all of these. A classification score measures a trained algorithm's accuracy at recognizing pattern(s), such as facial recognition.

An F1 score measures accuracy of binary recognition, such as whether or not an email is spam. A loss metric measures inaccuracy, such that a lower score is better. For a score based on an inverted scale that measures accuracy, a higher score is better. In an embodiment, scores 171-172 instead measure time spent training, such that a low score is better because that indicates faster training.

Current value range 133A may, for example, be a natural sequence of numeric values, such as 147-149. Although not shown, current value range 133A may be delimited by a minimum value and a maximum value.

During or at the end of epoch 111, current value range 133A of explored hyperparameter 123 may be narrowed by adjusting the minimum and/or maximum of the range to exclude values of tuples that yielded inferior scores. The narrowed range may be propagated into the next epoch.

For example, current value range 133B of epoch 112 may be the result of narrowing current value range 133A during epoch 111. Heuristics for optimal narrowing are discussed later herein.

3.0 Gradient Search Space Reduction

Figure 2:
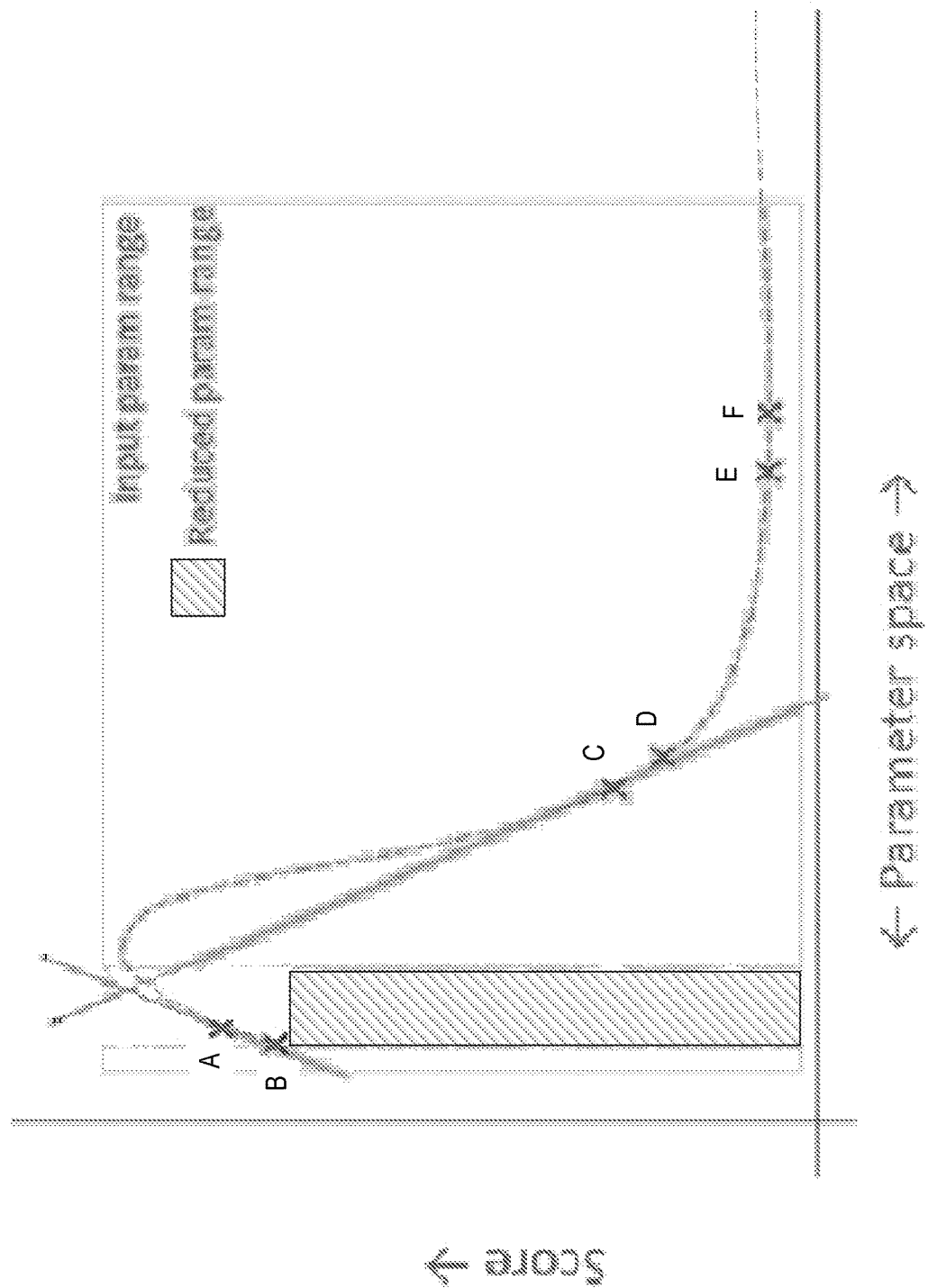
FIG. 2 is a block diagram that depicts an example computer that uses gradient search space reduction to estimate an optimal point on a curve of scored values of a hyperparameter, in an embodiment.

FIG. 2 is a block diagram that depicts example computer 100 that was shown in FIG. 1. Computer 100 uses gradient search space reduction to estimate an optimal point on a curve of scored values of a hyperparameter.

During epoch 111, only values that are within current value range 133A are explored for hyperparameter 123. The horizontal (independent) axis of the shown graph spans current value range 133A.

3.1 Curve Sampling

For example, current value range 133A may be a continuous sequence of real numbers. Tuples that have hyperparameter 123 set to explore those real numbers may yield training scores that are calibrated by the vertical (dependent) axis of the graph and that appear along the shown curve that has a fat tail on the right.

Exploration is needed because computer 100 does not know the shape of the shown curve and does not know where is the curve's peak (best) score, which corresponds to the best value for hyperparameter 123. Exploration entails sampling values within current value range 133A.

In an embodiment, computer 100 selects a fixed amount of values within current value range 133A. In an embodiment, the values are selected to be equally spaced within current value range 133A, and thus equally spaced along the horizontal axis.

Tuples may be generated that each has one of the selected values for hyperparameter 123. Hyperparameters 121-122 are held constant within those tuples.

The machine learning algorithm may be configured based on those tuples and trained and scored. Each point of the curve represents the score of a distinct (actual or possible) tuple having a distinct value for hyperparameter 123.

3.2 Gradient Detection

For example, if three values are sampled within current value range 133A, then their scores may be plotted on the curve as X's such as B, C, and E. The utility of points B, C, and E is diminished because they are spaced too far apart to accurately assess the slope (i.e. gradient) of the curve at those points.

To each sampled value may be added a small fixed offset to derive a more or less neighboring value that may also be used to generate a configuration tuple for training and scoring. For example, points B, C, and E have neighboring points A, D, and F. The neighboring points are slightly to the right of the original points because the added offset is positive.

Each original point and neighboring point form a pair of points, such as A-B, C-D, and E-F. Each pair of points forms a line segment that has an accurate gradient.

Important information may be derived from the pair gradients and the scores. For example, the scores may be sorted to establish that B is better than C, and A is best.

3.3 Peak Approximation

The pairs may be sorted by score to establish that pair A-B is best, and C-D is second best. The line segments of the two best pairs may be extended as lines that intersect at a particular point.

As shown, the intersection point is a more or less accurate approximation of the actual peak (shown although not yet discovered). Because the intersection point is an imperfect approximation, it is not immediately adopted as the optimal value for hyperparameter 123.

3.4 Range Narrowing

Instead, current value range 133A is narrowed to somewhat confine the intersection point. The precise minimum and maximum of the narrowed range are calculated as follows.

If the best pair (A-B) is to the left of the intersection point as shown, then the new minimum is based on A-B. Otherwise, the new maximum is based on A-B.

Within best pair A-B, one point (A or B) has a higher score than the other point. In an embodiment, the horizontal position of the higher scoring point is used to set the new minimum or maximum for the new value range of hyperparameter 123. In an embodiment, the lower scoring point of the best pair is used instead.

Whichever of the new minimum or maximum is not based on A-B is instead based on the intersection point. Because the intersection point is merely approximate, it should not be directly used as a new minimum or maximum, which has too high a likelihood of excluding the actual peak from the narrowed range.

Instead, the horizontal position of the intersection point is expanded away from the best pair (e.g. rightwards as shown) by a small fixed offset, thereby increasing the likelihood that the actual peak is included in the narrowed range as shown. While current value range 133A originally spanned the entire width of the graph, after narrowing as shown, the new range is reduced to be only the width of the hatched vertical band.

3.5 Next Epoch

Such narrowing concludes epoch 111, which may be followed by another epoch for the same particular hyperparameter. That best-so-far hyperparameter value, score, and latest current value range may be propagated into next epoch 112. For example referring to FIG. 1, repeated narrowing of current value range 133A may be reused as current value range 133B when next epoch 112 starts.

Other hyperparameters 121-122 may each also finish a separate epoch at a different time. Depending on the embodiment, an epoch that finishes early for one hyperparameter may or may not wait for an epoch that finishes late for a different hyperparameter, such that parallel epochs for different hyperparameters may or may not be synchronized.

In any case, the best-so-far hyperparameter value, score, and/or tuple may be shared (e.g. posted in a global variable) for epochs of other hyperparameters to obtain. An epoch that explores one hyperparameter may use the current best value of each of the other hyperparameters as a constant for the other hyperparameter in all of that epoch's generated tuples.

For example when epoch 111 begins, it may set same values 143 and 146 to constants that emerged as best values in previous epochs that explored respective hyperparameters 121-122. Thus although all but one value of each tuple is held constant during an epoch, the constants may improve between epochs, thereby ensuring that optimality is eventually achieved for a combination of hyperparameters and not merely each hyperparameter in isolation.

Because epochs occur in sequence for a particular hyperparameter, the intersection-based narrowing process may be repeated by sampling points and synthesizing neighboring points within the narrowed range to achieve further narrowing. Depending on conditions that are discussed later herein, narrowing may be repeated few or many times, but only once during each epoch.

Eventually the sequence of epochs ends, and repeated narrowing has more or less converged upon the actual peak. Thus, a nearly-optimal (best so far) value for hyperparameter 123 may be found by the end of a final epoch.

3.6 Result

Ultimately from epochs of exploration of hyperparameters, a best tuple or best few tuples are discovered that represent more or less optimal configuration(s) of the machine learning algorithm. Computer 100 (or a downstream computer) may then use the best tuple(s) to achieve a useful result. For example, computer 100 may use the best tuple(s) to eventually extensively train one or a few alternate configurations of the algorithm. For example, a useful result may be a well configured and well trained instance of the algorithm that is ready for production use.

The techniques herein improve the performance of computer 100 itself in various ways. By intelligently pruning the hyperparameter hyperspace, exploration of an excessive count of hyperparameter configurations is avoided. By ultimately selecting the best tuples/configurations, extensive training of an excessive count of different algorithm configurations is avoided.

Thus, subsequent training (e.g. by computer 100) occurs faster. Likewise, the trained selected algorithm configuration(s) achieve higher accuracy in production use (e.g. by computer 100). Thus, computer 100 is accelerated as an algorithm training computer and is more reliable (accurate) as a production inference computer. By reducing the computational burden of these activities, the techniques herein are accelerated (i.e. save time) and save energy.

4.0 Example Optimization Process

Figure 3:
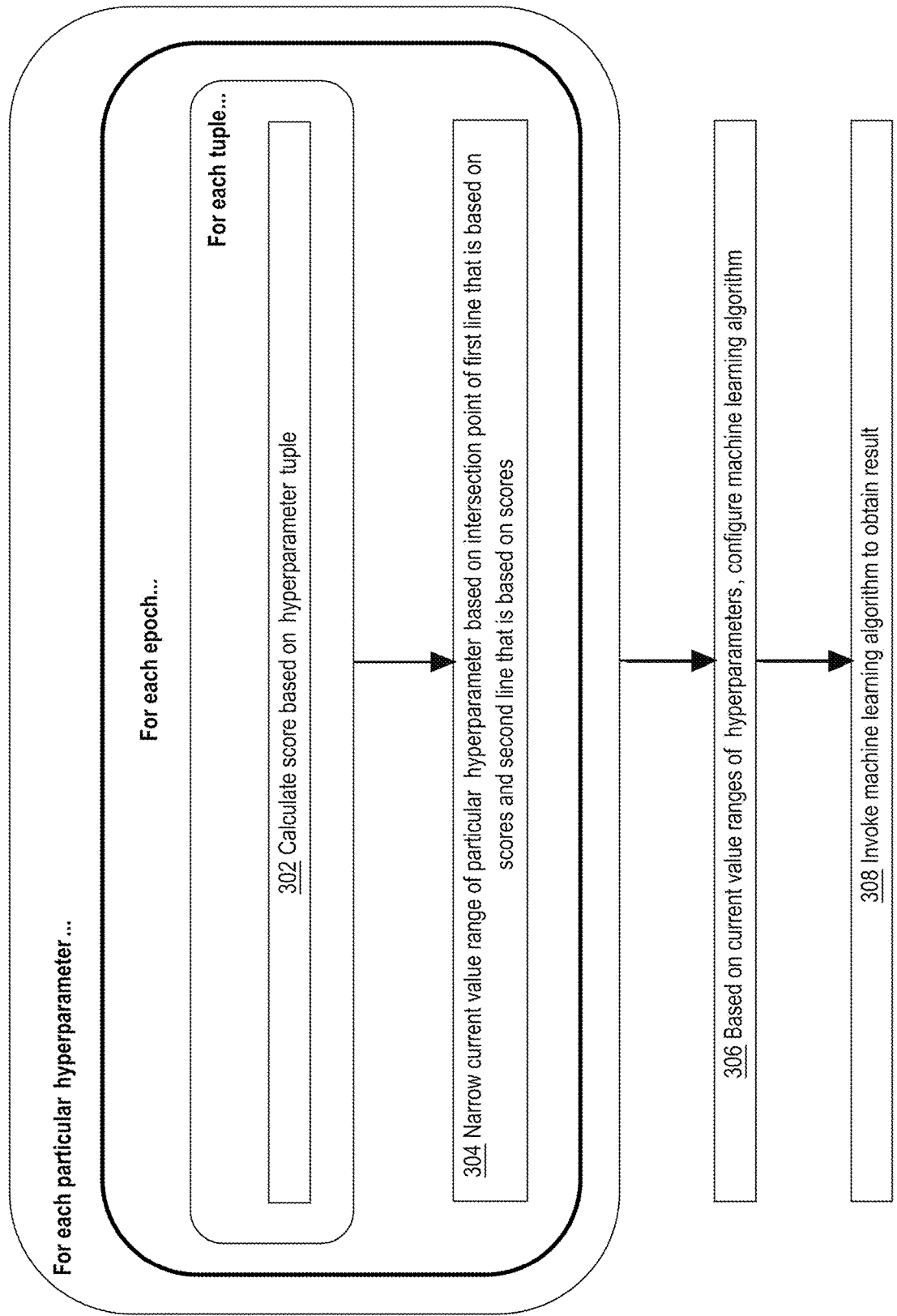
FIG. 3 is a flow diagram that depicts an example process for repeatedly narrowing value ranges of hyperparameters of a machine learning algorithm to discover hyperparameter values that are optimal for configuring the algorithm for training, in an embodiment.

FIG. 3 is a flow diagram that depicts computer 100 repeatedly narrowing value ranges of hyperparameters of a machine learning algorithm to discover hyperparameter values that are optimal for configuring the algorithm for training, in an embodiment. FIG. 3 is discussed with reference to FIGS. 1-2.

Steps 302 and 304 discover an optimal configuration tuple of values of hyperparameters of an algorithm. Steps 306 uses the optimal tuple to configure and extensively train the algorithm. Steps 302, 304, and 306 may occur in a laboratory environment. Step 308 uses the trained algorithm to achieve a useful result, such as pattern recognition, such as in a production environment.

Steps 302 and 304 comprise an epoch. Each (numeric) hyperparameter may have its own sequence of exploration epochs. For example, hyperparameter 123 is explored during epochs 111-112.

Each epoch generates multiple tuples for a particular hyperparameter. For example, computer 100 generates tuples 151-152 during epoch 111.

Half of the tuples are generated by sampling at equal spacing along the current value range of the particular hyperparameter, such as tuples B, C, and E of FIG. 2. The other half of the tuples are generated by adding a small fixed offset to the value of the particular hyperparameter for each of the sampled tuples. For example, tuples A, D, and F are based on an offset from respective tuples B, C, and E.

4.1 Initialization

As explained above, most of the values of an epoch's tuples are held constant, which may be based on best values of hyperparameters so far when that epoch begins. However, each hyperparameter has its own first epoch, which has no prior epochs to provide a best value.

In an embodiment, the midpoint (or a random value) of each initial value range of each numeric hyperparameter is used to compose an initial best tuple and initial best value shared by all hyperparameters. In an embodiment not shown, the processing of FIG. 3 may be prefaced by an initial exploration for initial best values.

The initial exploration may, by exhaustive combinatorics, generate (and score) tuples based on the minimum possible value or the maximum possible value of each numeric hyperparameter. In an embodiment, the midpoint value is also used. In an embodiment, each hyperparameter is initially explored independently, with values for other hyperparameters held at some initial constant, such as a midpoint value.

4.2 Exploration

Each tuple is individually generated and processed in step 302. Thus, step 302 is repeated for each of many tuples.

Ultimately in step 302, a score is calculated for a tuple. For example, computer 100 generates tuple 152 that has exploration value 148 for hyperparameter 123 and hyperparameter-specific constants 143 and 146 for other hyperparameters 121-122.

Step 302 configures the machine learning algorithm based on tuple 152 and then trains and scores the configured algorithm to obtain score 172 for tuple 152.

After repeating step 302, all of the tuples of epoch 111 have scores. Those scores are used in step 304 at the end of epoch 111. Thus, step 304 occurs once per epoch.

In step 304, a current value range of a particular hyperparameter is narrowed based on an intersection point of a first line that is based on the tuple scores and a second line that is also based on the tuple scores. For example, the scores (with their tuples) are sorted to select a best (highest scoring) four tuples. For example, the best four tuples in descending order are A, B, C, and D.

The best and second best tuples form a best pair. For example, tuples A and B form a best pair A-B.

The third and fourth best tuples form a second best pair. For example, tuples C and D form a second best pair C-D.

A first line passes through the tuples of the best pair. A second line passes through the tuples of the second best pair.

The first and second lines intersect at an intersection point. The current value range of the particular hyperparameter is narrowed to only extend from the best tuple to slightly past the intersection point. Thus, the current value range of the particular hyperparameter should be narrower at the end of the epoch (the end of step 304) then at the beginning of the epoch (the beginning of step 302).

4.3 Epoch Sequencing

After step 304, control may advance to step 306 or else revisit steps 302 and 304 in a next epoch. In either case, the current epoch has ended.

Which step follows 304 depends on epoch sequencing criteria. If the current value range of the particular hyperparameter is still converging (improving), then a next epoch begins by revisiting step 302.

Convergence occurs when any of the following termination conditions occur:
The first and second lines do not intersect. For example, gradient is zero at the peak.
The intersection point falls outside of the current value range.
The width of the current value range has narrowed to within an absolute threshold or to within a percent threshold relative to the midpoint of the range.

If convergence occurs, such as because the best score achieved during the current epoch is not a (significant) improvement over the best score of the previous epoch for the particular hyperparameter, then the sequence of epochs for the particular hyperparameter terminates. Epoch sequences of some other hyperparameter(s) may have already terminated earlier.

Epoch sequences of some other hyperparameter(s) may still be ongoing. For example, a first epoch of hyperparameter 123 may still be occurring while a first epoch of hyperparameter 122 has finished. Such temporal skew may naturally occur, such as when hyperparameter 123 has a naturally wide value range of many possible values, and hyperparameter 122 does not have a wide range.

Step 306 does not occur until the epoch sequences of all hyperparameters finish, by which time computer 100 has a nearly globally optimal tuple. In step 306, the machine learning algorithm is configured based on the optimally narrowed current value ranges of the algorithm's hyperparameters.

4.4 Hill Climb After Epoch Sequence

In an embodiment, the algorithm is configured with the nearly globally optimal tuple. In an embodiment, step 306 may finally use a gradient ascent/descent (greedy hill climbing) to reach a globally optimal (best possible score) tuple from the nearly globally optimal tuple.

In an embodiment, greedy hill climbing independently occurs for each numeric hyperparameter, based on that hyperparameter's best tuple, to find an even higher scoring tuple for that hyperparameter. Thus, a greedy best value for a hyperparameter may be found after the hyperparameter's epoch sequence has finished.

A new tuple may be synthesized from the greedy best values of all hyperparameters. That tuple may be scored to detect whether or not it exceeds all individual greedy best values.

4.5 Final Configuration

Step 306 may extensively train the algorithm as configured with the best tuple. In an embodiment, computer 100 repeatedly configures and extensively trains the algorithm with each of the best few tuples to empirically find which configuration of the algorithm actually is the best of all.

Training of the algorithm may occur in both of steps 302 and 306. However, step 302 may use a small training dataset for efficiency during exploration, and step 306 may instead extensively train with a large dataset in anticipation of production use.

At the end of step 306, the algorithm has been extensively trained and ready for production deployment and use. Use of the extensively trained algorithm occurs during step 308.

In step 308, the extensively trained algorithm is invoked to obtain a result. For example, the algorithm may be deployed in a smartphone and subjected to a natural stimulus pattern, such as a photograph.

The algorithm may infer/recognize/classify with the photograph to obtain a conclusory result. For example, the result may be a detection that the photograph does or does not contain a human face, which may be important to an installed smartphone app, such as a camera application.

5.0 Tracking Best Scores

Figure 4:
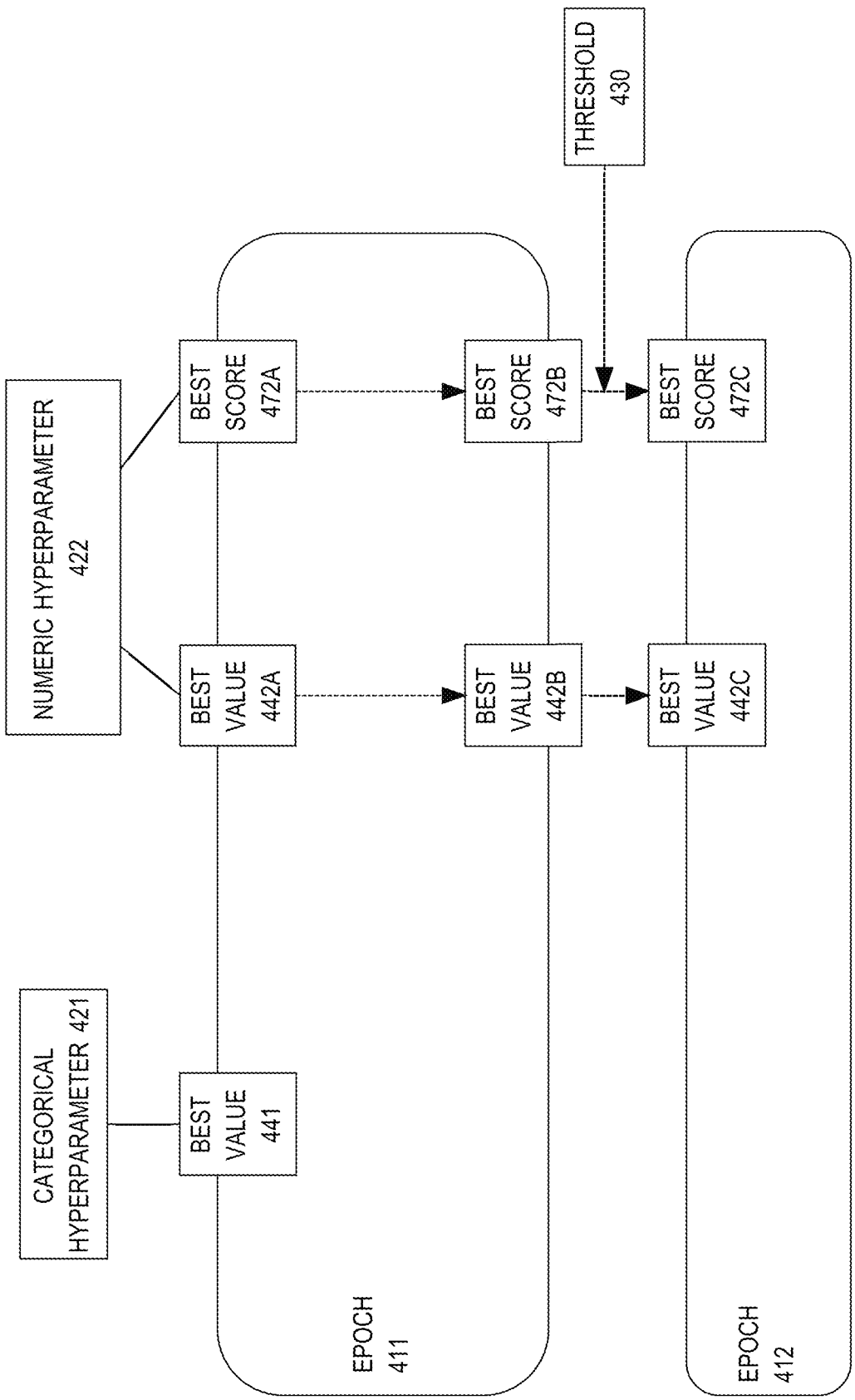
FIG. 4 is a block diagram that depicts an example computer that combines epoch management with dynamic tracking of best scores and values for numeric and/or categorical hyperparameters, in an embodiment.

FIG. 4 is a block diagram that depicts an example computer 400, in an embodiment. Computer 400 combines epoch management with dynamic tracking of best scores and values for numeric and/or categorical hyperparameters. Computer 400 may be an implementation of computer 100.

Epochs 411-412 explore hyperparameter 422. Epoch 411 begins with best values so far, such as 441 and 442A, for all hyperparameters, such as 421-422.

Epoch 411 also begins with best score 472A so far for exploration hyperparameter 422. Because epoch 411 repeatedly samples and narrows the current value range (not shown) for hyperparameter 422, best score 472A may improve on none, one, few, or many occasions during epoch 411.

Whenever best score 472A improves, so too best value 442A also changes. Whenever best score 472A improves, the new best score and best value are recorded, but only for hyperparameter 422.

Other (e.g. concurrent) epochs (not shown) that explore other hyperparameters maintain their own dynamic best score and best value for their respective exploration hyperparameter. Thus, computer 400 actually tracks multiple best scores and best values individually for each hyperparameter (i.e. each independent sequence of epochs).

An embodiment may also record as a new best tuple, the current tuple when a new best score is achieved. Likewise, the dynamic best tuple is separately tracked per hyperparameter.

By the time epoch 411 finishes, best values 442A and best score 472A have (e.g. repeatedly) improved to become best value 442B and best score 472B. The improved values may be reused as best value 442C and best score 472C to begin next epoch 412.

Additional processing may occur during epoch 411 or between epochs 411-412. Between epochs 411-412, best value 442A may be made globally available for all hyperparameters to use in their next (not current) epoch.

For example, another hyperparameter (not shown) may more or less concurrently have its own epoch that temporally partially overlaps with epoch 411 and finishes before epoch 411. Epoch 412 may use the globally available best value for that other hyperparameter.

5.1 Best Combination

However, even though epoch 411 and the overlapping epoch may both finish by publishing a respective new best value, such as value A and value B (not shown), the techniques described above might not actually generate a tuple that has both values A and B together. For example, even though epoch 412 starts with value 442C as a recorded best, a sampling technique might cause epoch 412 to never actually generate a tuple with best value 442C in the tuple, but instead generate tuples based on sampling near (but not at) best value 442C.

Thus between epochs 411-412, computer 400 may synthesize and score a tuple that has the best globally-available value for every hyperparameter. Even though the synthesized tuple reuses best value 442B that originally yielded best score 472B, the synthesized tuple may sometimes score higher than best score 472B. Thus although not shown as such, best score 472C for next epoch 412 may actually be a copy of whichever score is higher: the score of the synthesized tuple or best score 472B.

The score of the synthesized tuple may also be better than the published best score of other hyperparameter(s) also. In an embodiment, those published best scores are also updated and associated with the synthesized tuple.

The score of the synthesized tuple may also surpass the score of a global best tuple, which computer 400 also tracks. Thus, the global best tuple and score may reflect a tuple and score that were generated during an epoch or that were synthesized in between epochs.

5.2 Categorical Hyperparameter

Unlike numeric hyperparameters, such as 422, not all hyperparameters have a reliable gradient. That is because, some hyperparameters lack a relative natural ordering of values that can provide a gradient.

Some hyperparameter types lack a monotonic value range that spans from a minimum value to a maximum value. Thus, some techniques herein based on gradients and intersecting lines do not work for some types of hyperparameters.

Categorical (i.e. non-numeric, e.g. literal or symbolic) hyperparameters, such as 421, are not amenable to range narrowing and do not have their own epochs. For example, a Boolean hyperparameter lacks a meaningful gradient, especially because two best pairs of points (i.e. four best values) cannot be obtained from a value domain having only two values (i.e. true and false, or one and zero).

Even a many-valued symbolic hyperparameter (e.g. having values of seven geographic continents of Africa, Antarctica, Asia, Australia, Europe, North America, and South America) has no natural relative ordering of the values. Thus, a special technique is needed to explore categorical hyperparameters that is not based on gradient.

As shown, categorical hyperparameter 421 may provide its best value 441 as a constant to epochs of other hyperparameters, such as 411. However, categorical hyperparameter 421 does not have its own epochs.

Thus, categorical hyperparameter 421 is usually not explored while epoch(s) occur. However, a radical improvement to a best score of a numeric hyperparameter such as 422 during an epoch may indicate discovery of a new subspace of the configuration hyperspace that imposes a new performance regime.

The new performance regime may favor (i.e. score higher) a different value of categorical hyperparameter 421 than best value 441. When epoch 411 ends, if new best score 472B for numeric hyperparameter 422 exceeds old best score 472A by more than absolute or percent threshold 430, then computer 400 detects that some or all categorical hyperparameters, such as 421, need spontaneous exploration.

As shown, threshold 430 is applied (tested) in between epochs 411-412. In an embodiment, threshold 430 may be dynamically/continually applied during epoch 411.

When threshold 430 is crossed, exploration of categorical hyperparameter(s) is triggered. As with an epoch, tuples are generated with constants for best values of other hyperparameters.

A distinct tuple for each possible value of categorical hyperparameter 421 is generated. These tuples are scored, which may cause best value 441 to be surpassed by a different category value that has a better score, which is publicized for use by numeric hyperparameters when they start their next epoch.

Other categorical hyperparameters may be explored in a similar way. Thus, best value, score, and tuple of each categorical hyperparameter is also tracked globally.

5.3 Re-Visitation

As discussed, tuples are generated or synthesized at various times, such as during an epoch, between epochs, and when triggered by a threshold. Each of these occasions that create tuples may do so in somewhat different ways, as already discussed.

Thus there is a chance that a same tuple may be unnecessarily revisited, which would cause redundant training and scoring, which is wasteful, especially of time. Such redundancy may be exacerbated by concurrent epochs for different hyperparameters.

Redundant training and scoring may be avoided by maintaining a lookup table (not shown) that maps each known (already visited) tuple to its score. When a tuple is created and supposedly needs training and scoring, the tuple may be used as a lookup key for attempting to retrieve a known score.

If a score is retrieved, then that score is used instead of redundantly training and scoring the tuple, because a tuple's score never changes. Otherwise, the tuple truly is novel and is used for training and scoring, and the new score should become associated with the new tuple in the lookup table.

6.0 Categorical Optimization

Figure 5:
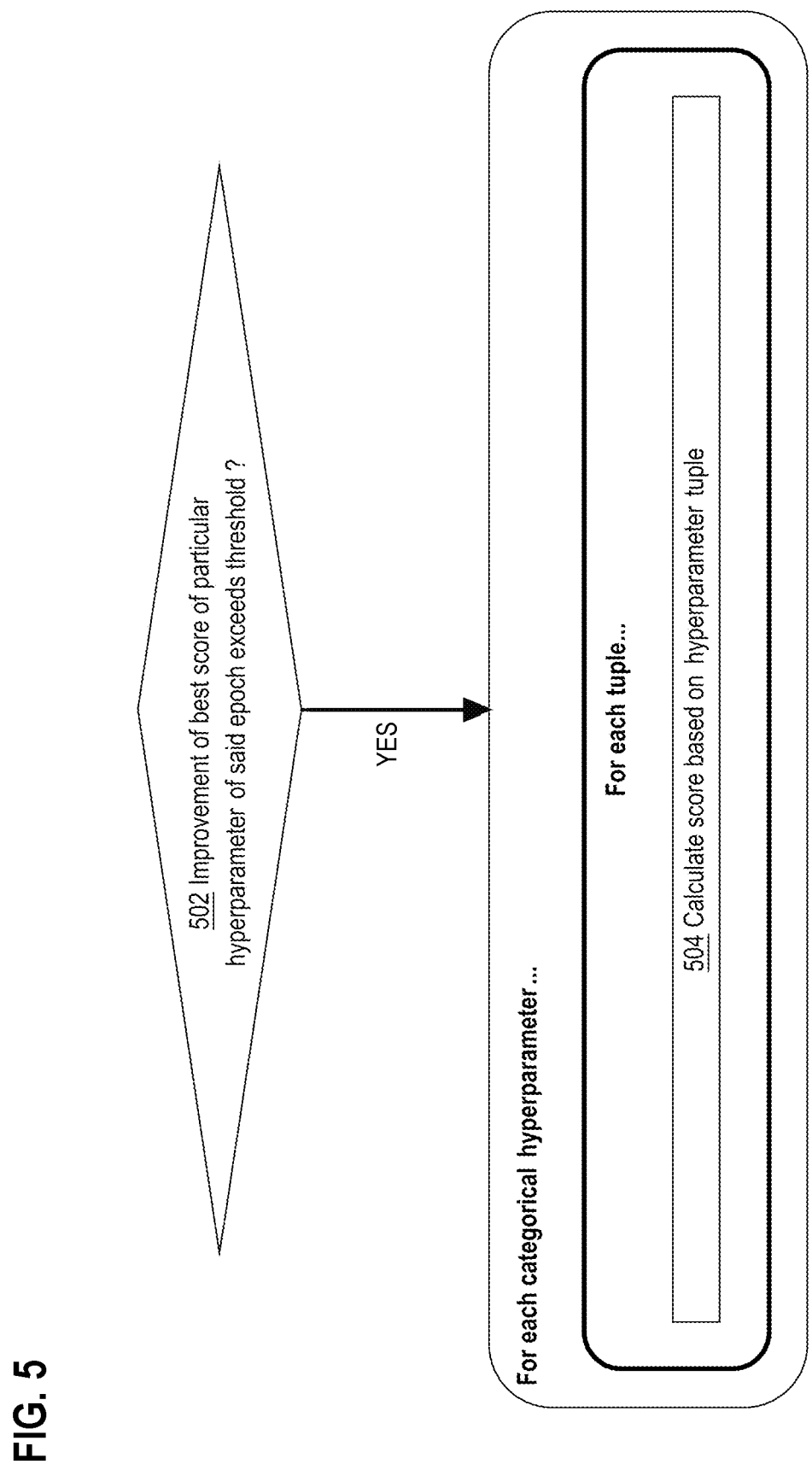
FIG. 5 is a flow diagram that depicts an example process for optimizing categorical hyperparameters, in an embodiment.

FIG. 5 is a flow diagram that depicts computer 400 optimizing categorical hyperparameters, in an embodiment. FIG. 5 is discussed with reference to FIG. 4.

As explained above, categorical hyperparameters lack a gradient. Thus, categorical hyperparameters are explored in a special way that is not based on epochs.

Step 502 dynamically detects when to further optimize categorical hyperparameters. In an embodiment, step 502 occurs at the end of an epoch. In an embodiment, step 504 may dynamically occur at anytime during an epoch.

Step 502 detects whether or not an improvement to a best score of a particular hyperparameter of an epoch exceeds a threshold. The threshold may be an absolute difference or a percent difference of a best score between the beginning of the epoch and, depending on the embodiment, either the end of the epoch or anytime during the epoch that the best score improves.

In an embodiment, the threshold is compared to a best score of the particular hyperparameter of the epoch. In an embodiment, the threshold is instead compared to a globally best score, irrespective of the particular hyperparameter.

If step 502 does not detect a significant improvement, then optimization of categorical hyperparameters does not occur at this time. If step 502 does detect a significant improvement, then optimization of categorical hyperparameters begins (with step 504).

Such optimization may occur for one, some, or all categorical hyperparameters, depending on the embodiment. As shown, all categorical hyperparameters are optimized.

6.1 Categorical Combinatorics

When multiple categorical hyperparameters are optimized, exploration of each categorical hyperparameter may occur separately (e.g. separate tuple sets) in one embodiment as shown, or the multiple categorical hyperparameters may be explored together (e.g. shared set of tuples) in another embodiment (not shown). Which of those two embodiments is better may depend on the amount of categorical hyperparameters and the amount of possible values for those categorical hyperparameters.

For example, twenty categorical hyperparameters that each have two possible values corresponds to a hyperspace of 20×2=40 tuples. Whereas, fifty categorical hyperparameters that each have thirty possible values corresponds to a hyperspace of 50×30=1,500 tuples.

In a dynamic embodiment, when such combinatorics would yield less than a threshold amount of tuples, then the multiple categorical hyperparameters are explored together with a shared set of tuples. In this case, tuples are generated by exhaustively enumerating all possible combinations of all possible values of all of the multiple categorical hyperparameters.

In that dynamic embodiment, when such combinatorics would exceed the threshold, then each categorical hyperparameter has a separate set of tuples to explore. In this case, values for categorical hyperparameters other than the particular categorical hyperparameter being explored are held constant in the tuples at their best value so far. Only the particular hyperparameter in its separate set of tuples has all of its possible values enumerated those tuples.

In any case, numeric (non-categorical) hyperparameters are held constant at their best value so far in all of the tuples generated for categorical exploration. Tuples are generated and used in step 504. Step 504 is repeated for each tuple generated during categorical exploration.

In step 504, a score is calculated based on the generated tuple. For example, a tuple is generated, used to configure the algorithm, and then the configured algorithm is trained and scored.

Each categorical hyperparameter may have a best value, best score, and/or best tuple so far. Such best data may become updated by categorical exploration.

When finished, categorical exploration may publish revised bests for use as constants in tuples of future epochs that explore numerical hyperparameters.

7.0 Horizontal Scaling

Figure 6:
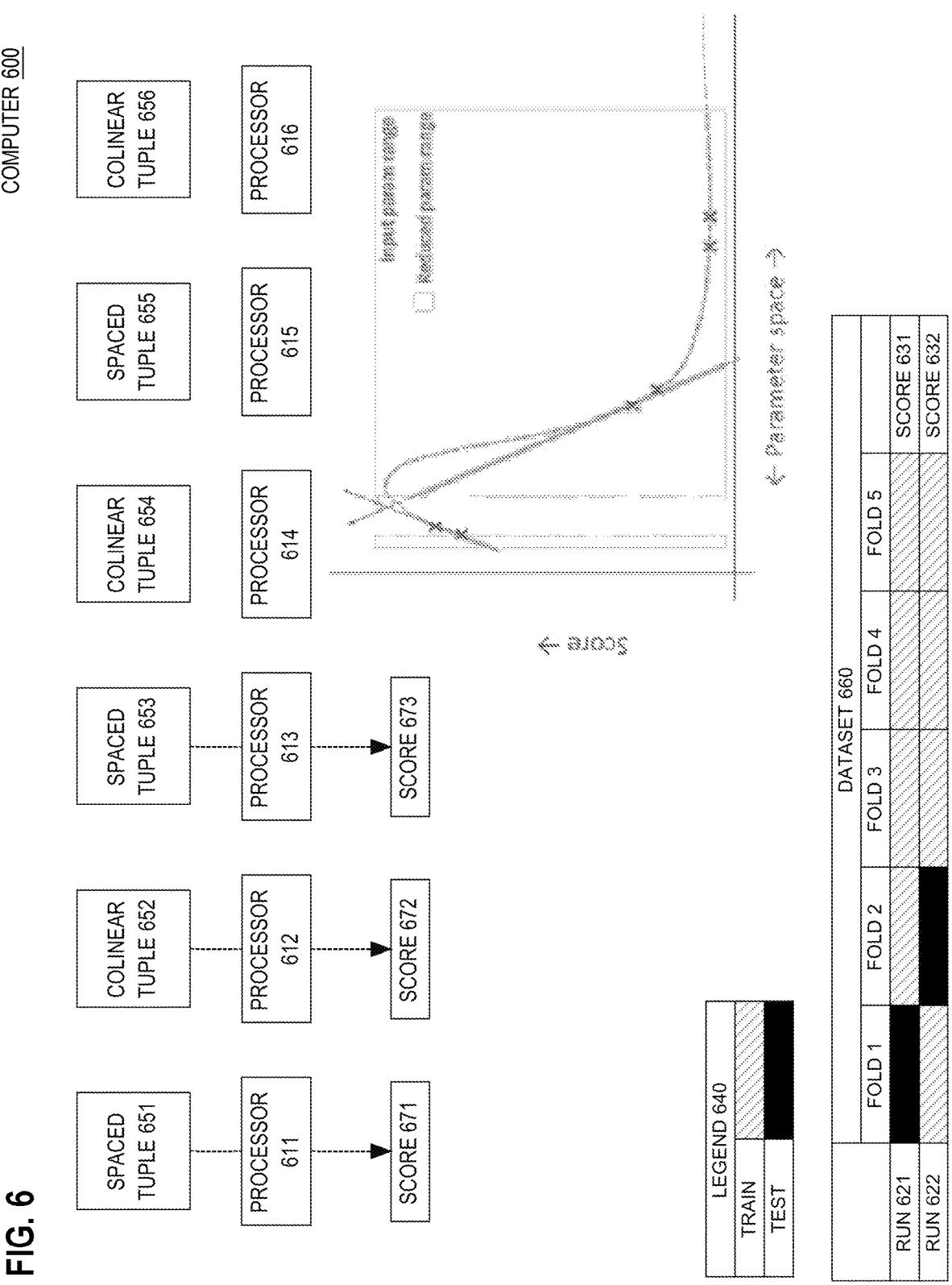
FIG. 6 is a block diagram that depicts an example computer that horizontally scales, in an embodiment.

FIG. 6 is a block diagram that depicts an example computer 600, in an embodiment. Computer 600 horizontally scales. Computer 506 may be an implementation of computer 100.

7.1 Multiprocessing

Computer 600 has multiple processors 611-616, each of which may be a networked computer, a central processing unit (CPU), a processor core such as for multicore processing, a hardware hyperthread, a virtual machine, a heavyweight operating system process, or a lightweight thread. Depending on the embodiment, computer 600 may be a federation or cluster of computers or a multicore computer that supports symmetric multiprocessing (SMP).

7.2 Concurrency

Each of processors 611-616 may provide one or more computational threads for coarse-grained (a.k.a. task-based) parallelism. Coarse-grained parallelism may be heterogeneous, such that processor 611 may train a configured algorithm while processor 612 manages an epoch.

Processor 611 may train an algorithm configuration with one thread and simultaneously manage an epoch with another thread. Processor 611 may train one algorithm configuration for one hyperparameter's epoch while a same or different processor simultaneously trains another algorithm configuration for the same epoch or another hyperparameter's epoch.

Thus computer 600 has a variety of ways to scale horizontally as much as possible and/or overload a processor with additional tasks as needed.

7.3 Load Balancing

An ideal work distribution is shown for maximum horizontal scaling of a single epoch, such that each processor trains and scores one algorithm configuration in parallel. For example, processor 611 trains the algorithm configured by tuple 651 while processor 612 trains based on tuple 652.

That ideal work distribution is actually achievable, regardless of how many processors are available, so long as at least four processors are available to simultaneously train the two pairs (four points) needed to cause intersecting lines shown in the graph as explained above. An ideal work distribution can also be achieved with more than four processors, so long as there is an even number of processors to simultaneously train more than two pairs, because each pair has an even number (two) of points.

An odd or mismatched number of processors may still horizontally scale, although the workload may be somewhat imbalanced, such that some processor(s) may finish early and then may possibly wait (idle). Even when one epoch is imbalanced by itself, idleness may be more or less avoided with concurrent epochs of different hyperparameters.

To achieve an ideal load distribution based on an arbitrary even amount of processors, a hyperparameter's current value range should be sampled along half as many points as available processors. Thus, there are two processors per sampled point, which is important because each sampled point occurs in a pair of points that also includes a synthesized point based on adding an offset to the sampled value, as explained above.

With six available processors 611-616, then 6/2=three (equally spaced) values should be sampled. From those, three pairs can be obtained by adding three offset-based colinear additional points.

For example, spaced tuple 651 is a sample, and colinear tuple 652 is offset-based, such that tuples 651-652 form a pair. The six points of the three pairs are shown as X's in the graph.

Each processor 611-616 trains based on a respective tuple based on a respective point of the six points. Thus, six tuples are simultaneously used for training on six processors to detect one intersection of two lines.

Thus during a multi-iteration epoch, one iteration of value range narrowing based on finding one intersection point may completely occur in only the time that it would take to train the algorithm once in isolation, even though six trainings may actually occur. Thus, more or less linear speedup may be sustained within one epoch and across multiple epochs to the extent allowed by Amdahl's law.

7.4 Synchronization

Because parallelism may occur for exploring one hyperparameter and/or across simultaneous explorations for multiple hyperparameters, and because best values, scores, and tuples are occasionally publicized (e.g. global variables), a possibility of a concurrent read and write of a variable by different processors or of concurrent writes arises. Thus without additional thread safety, a pathological race condition that causes or is caused by incoherent data may occur.

For thread safety, processors 611-616 may, for example, locally cache some data at the beginning of an epoch, as read from a global data structure, and then flush dirty data (e.g. improved score) back to the global data structure at the end of an epoch. Thus, thread synchronization may be more or less confined to between epochs.

Global data structures should be guarded as needed to, for example, allow concurrent readers, but serialize writers, such as with read/write locks that protect critical sections of logic.

For example, Java has a more or less robust memory consistency model that includes synchronized logic, volatile variables, and the java.util.concurrent package of utility classes. Remote synchronization may be more involved with spin locks, test-and-set instructions, and memory fences to maintain cache coherency.

7.5 Cross Validation

Ideally, training with an infinitely large dataset might achieve nearly perfect scores. However, that requires infinite time, which is infeasible.

In practice, ideal scores are sacrificed for efficient training by using a limited training dataset. According to the holdout method of training, a small portion (i.e. should not exceed one third) of the training dataset is not used for training, but is instead used for testing (e.g. scoring), because testing and training should, for best results, not use the same data.

With cross validation, the original dataset is equally partitioned at least three ways known as folds. Five folds is empirically best. Folds may be stratified, such that original data is carefully sorted so that each fold has an equal amount of particular kinds (e.g. classifications) of data.

Ideally, the folds can be reused to make as many training datasets as there are folds, although more or less is also possible. Each dataset may use some (ideally all but one) of the folds for training.

At least one (usually the only one) of the remaining folds is used for testing. Each of the different training datasets uses a different fold for testing.

For example, dataset 660 is partitioned into equally sized folds 1-5 for reuse during five-way cross validation. Subsets of those reusable folds are used to make a distinct training dataset for each of at least training runs 621-622 that emit at least respective scores 631-632. Scores 631-632 may be averaged to calculate a single score for the tuple that configured the algorithm.

Each training run trains with a separate training dataset for a same tuple/configuration. For example according to legend 640, the training dataset of run 621 consists of folds 2-5, with fold 1 used as a test dataset.

Training datasets of different runs can partially overlap. For example, folds 3-5 are shared by runs 621-622.

Ideally, each fold is used as a testing dataset for exactly one training run. Thus ideally and although not shown, folds 1-5 should be reused for fives training runs, which may simultaneously occur in an embodiment.

For example, runs 621-622 may simultaneously occur on respective processors 611-612. Thus, cross validation is horizontally scalable.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
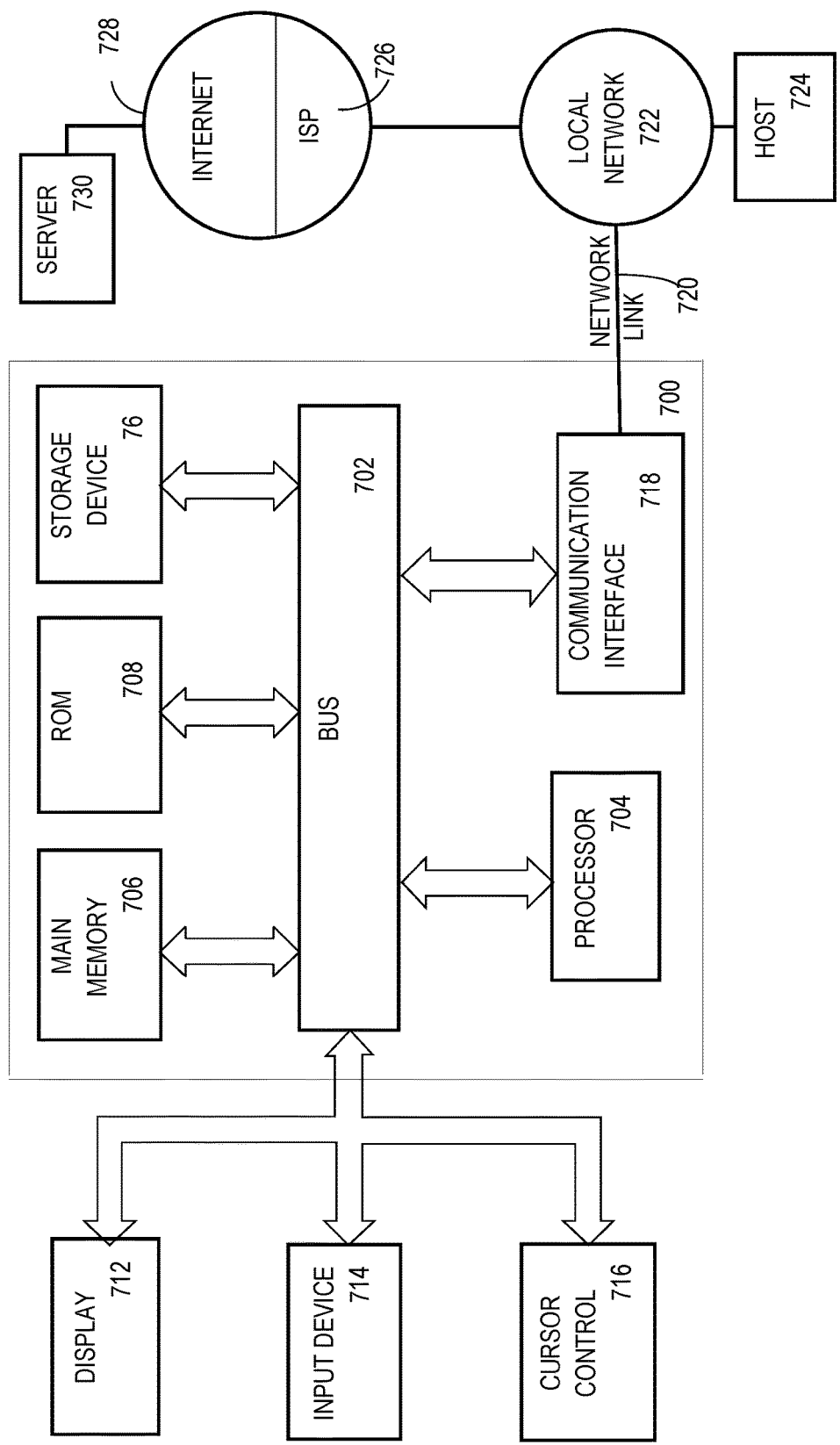
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 76, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 76. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 76. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 76 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 76, or other non-volatile storage for later execution.

10.0 Software Overview

Figure 8:
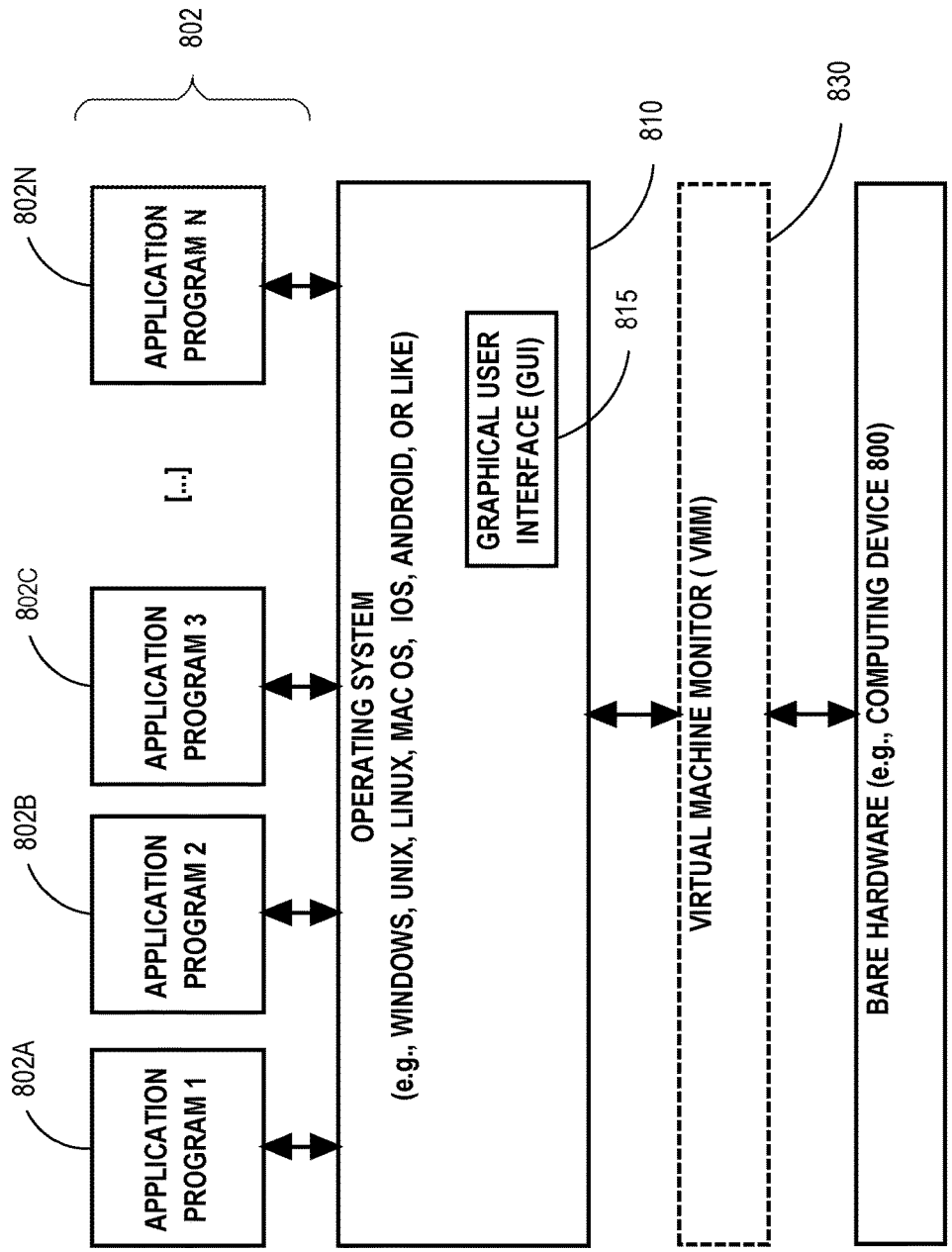
FIG. 8 is a block diagram that illustrates a basic software system that may be employed for controlling the operation of a computing system.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 76, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 76 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 800 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

8.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    for each particular hyperparameter of a plurality of hyperparameters that is not a categorical hyperparameter, for each epoch in a sequence of epochs, processing the particular hyperparameter by:
        a) for each hyperparameter tuple of a plurality of hyperparameter tuples, calculating a score based on the hyperparameter tuple, wherein:
            the hyperparameter tuple contains a distinct plurality of values,
            each value of the distinct plurality of values corresponds to a distinct hyperparameter of the plurality of hyperparameters and is contained in a current value range of said distinct hyperparameter, and
            each said distinct hyperparameter has its corresponding value held to a constant value across all of said plurality of hyperparameter tuples unless said distinct hyperparameter is said particular hyperparameter; and
        b) narrowing the current value range of the particular hyperparameter based on an intersection point of a first line that is based on said scores and a second line that is based on said scores;
    configuring, based on the current value ranges of the plurality of hyperparameters, a machine learning algorithm;
    invoking the machine learning algorithm to obtain a result.

2. The method of claim 1 wherein said calculating said score comprises updating a best hyperparameter value and a best hyperparameter score that are associated with said particular hyperparameter when said score exceeds said best hyperparameter score.

3. The method of claim 2 wherein said constant value is said best hyperparameter value that is associated with said distinct hyperparameter in a previous epoch, wherein said distinct hyperparameter was said particular hyperparameter in said previous epoch.

4. The method of claim 2 further comprising, at the end of said each epoch:
    calculating a score based on said best hyperparameter value that is associated with said each particular hyperparameter of said plurality of hyperparameters;
    updating said best hyperparameter value and said best hyperparameter score that are associated with said each particular hyperparameter of said plurality of hyperparameters when said score exceeds said best hyperparameter score.

5. The method of claim 1 wherein for each epoch in a sequence of epochs comprises, when an improvement of a best hyperparameter score of said epoch exceeds a threshold:
for each categorical hyperparameter of said plurality of hyperparameters that is a categorical hyperparameter, processing the particular hyperparameter by:
for each hyperparameter tuple of a second plurality of hyperparameter tuples, calculating a score based on the hyperparameter tuple, wherein:
the hyperparameter tuple contains a distinct plurality of values,
each value of the distinct plurality of values corresponds to a distinct hyperparameter of the plurality of hyperparameters and is contained in a current value range of said distinct hyperparameter,
each said distinct hyperparameter has its corresponding value held to a constant value across all of said plurality of hyperparameter tuples unless said distinct hyperparameter is said categorical hyperparameter, and
said categorical hyperparameter has a distinct value for each of said plurality of hyperparameter tuples.

6. The method of claim 1 wherein said for each particular hyperparameter occurs simultaneously for said plurality of hyperparameters.

7. The method of claim 1 wherein:
said plurality of hyperparameter tuples comprises a first subset of hyperparameter tuples and a second subset of hyperparameter tuples;
all values of the first subset that belong to said particular hyperparameter are equally spaced within said current value range of said particular hyperparameter;
for each equally-spaced hyperparameter tuple of the first subset, the second subset contains colinear hyperparameter tuple that differs from the equally-spaced hyperparameter tuple only by a predefined amount from the value of the equally-spaced hyperparameter tuple that belongs to said particular hyperparameter.

8. The method of claim 7 wherein:
the first line contains a first point and a second point;
the second line contains a third point and a fourth point;
the first point is based on a first hyperparameter tuple of the first subset that has a best score;
the second point is based on said colinear hyperparameter tuple for said first hyperparameter tuple;
the third point is based on a second hyperparameter tuple of the first subset that has a second best score;
the fourth point is based on said colinear hyperparameter tuple for said second hyperparameter tuple.

9. The method of claim 8 wherein narrowing the current value range of the particular hyperparameter is further based on a particular point of the first line.

10. The method of claim 9 wherein said particular point is one selected from the group consisting of: said first point and said second point.

11. The method of claim 9 wherein based on an intersection point comprises based on a point that is between the intersection point and said third point.

12. The method of claim 1 wherein:
said configuring based on the current value ranges of the plurality of hyperparameters comprises configuring based on a plurality of greedy values;
each greedy value of the plurality of greedy values belongs to a different hyperparameter of the plurality of hyperparameters;
each greedy value of the plurality of greedy values is calculated by a gradient ascent based on the value that belongs to said different hyperparameter in a hyperparameter tuple having the best of all scores.

13. The method of claim 1 wherein said constant value initially comprises one selected from the group consisting of a maximum value of said current value range and a minimum value of said current value range.

14. The method of claim 1 wherein said calculating a score for each hyperparameter tuple comprises simultaneously calculating scores for multiple hyperparameter tuples.

15. The method of claim 1 wherein a count of tuples in said plurality of hyperparameter tuples is based on a count of processors.

16. The method of claim 1 wherein said score based on the hyperparameter tuple comprises said score based on training said machine learning algorithm that is configured with the hyperparameter tuple.

17. The method of claim 16 wherein said score is based on at least one selected from the group consisting of:
fitness of said machine learning algorithm during or after said training, and
time spent during said training.

18. The method of claim 16 wherein said training is based on cross-validation comprising folds.

19. The method of claim 18 wherein at least one selected from the group consisting of:
said score is based on an average score of said folds,
said folds consist of five folds, and
said folds are stratified.

20. The method of claim 1 wherein said score is at least one selected from the group consisting of: a classification score, an F1 score, and a score based on a loss metric.

21. The method of claim 1 wherein calculating said score based on said hyperparameter tuple comprises:
using said hyperparameter tuple as a lookup key for retrieving a known score;
using the known score as said score if the known score is retrieved;
otherwise, calculating said score and associating said lookup key with said score.

22. The method of claim 1 wherein said sequence of epochs for said particular hyperparameter terminates upon an occurrence of at least one selected from the group consisting of:
the first line does not intersect the second line,
a width of the current value range of the particular hyperparameter does not exceed a first threshold, and
said intersection point indicates a value for the particular hyperparameter that is not within the current value range of the particular hyperparameter.

23. One or more non-transitory computer-readable media storing instructions that, when executed by one or more processors, cause:
for each particular hyperparameter of a plurality of hyperparameters that is not a categorical hyperparameter, for each epoch in a sequence of epochs, processing the particular hyperparameter by:
a) for each hyperparameter tuple of a plurality of hyperparameter tuples, calculating a score based on the hyperparameter tuple, wherein:
the hyperparameter tuple contains a distinct plurality of values, each value of the distinct plurality of values corresponds to a distinct hyperparameter of the plurality of hyperparameters and is contained in a current value range of said distinct hyperparameter, and each said distinct hyperparameter has its corresponding value held to a constant value across all of said plurality of hyperparameter tuples unless said distinct hyperparameter is said particular hyperparameter; and b) narrowing the current value range of the particular hyperparameter based on an intersection point of a first line that is based on said scores and a second line that is based on said scores;

configuring, based on the current value ranges of the plurality of hyperparameters, a machine learning algorithm;

invoking the machine learning algorithm to obtain a result.

24. The one or more non-transitory computer-readable media of claim 23 wherein said calculating said score comprises updating a best hyperparameter value and a best hyperparameter score that are associated with said particular hyperparameter when said score exceeds said best hyperparameter score.

25. The one or more non-transitory computer-readable media of claim 24 wherein said constant value is said best hyperparameter value that is associated with said distinct hyperparameter in a previous epoch, wherein said distinct hyperparameter was said particular hyperparameter in said previous epoch.

26. The one or more non-transitory computer-readable media of claim 24 wherein the instructions further cause, at the end of said each epoch:

calculating a score based on said best hyperparameter value that is associated with said each particular hyperparameter of said plurality of hyperparameters;

updating said best hyperparameter value and said best hyperparameter score that are associated with said each particular hyperparameter of said plurality of hyperparameters when said score exceeds said best hyperparameter score.

27. The one or more non-transitory computer-readable media of claim 23 wherein for each epoch in a sequence of epochs comprises, when an improvement of a best hyperparameter score of said epoch exceeds a threshold:

for each categorical hyperparameter of said plurality of hyperparameters that is a categorical hyperparameter, processing the particular hyperparameter by:

for each hyperparameter tuple of a second plurality of hyperparameter tuples, calculating a score based on the hyperparameter tuple, wherein:

the hyperparameter tuple contains a distinct plurality of values, each value of the distinct plurality of values corresponds to a distinct hyperparameter of the plurality of hyperparameters and is contained in a current value range of said distinct hyperparameter, each said distinct hyperparameter has its corresponding value held to a constant value across all of said plurality of hyperparameter tuples unless said distinct hyperparameter is said categorical hyperparameter, and said categorical hyperparameter has a distinct value for each of said plurality of hyperparameter tuples.

28. The one or more non-transitory computer-readable media of claim 23 wherein said for each particular hyperparameter occurs simultaneously for said plurality of hyperparameters.

29. The one or more non-transitory computer-readable media of claim 23 wherein:

said plurality of hyperparameter tuples comprises a first subset of hyperparameter tuples and a second subset of hyperparameter tuples;

all values of the first subset that belong to said particular hyperparameter are equally spaced within said current value range of said particular hyperparameter;

for each equally-spaced hyperparameter tuple of the first subset, the second subset contains colinear hyperparameter tuple that differs from the equally-spaced hyperparameter tuple only by a predefined amount from the value of the equally-spaced hyperparameter tuple that belongs to said particular hyperparameter.

30. The one or more non-transitory computer-readable media of claim 29 wherein:

the first line contains a first point and a second point;
the second line contains a third point and a fourth point;
the first point is based on a first hyperparameter tuple of the first subset that has a best score;
the second point is based on said colinear hyperparameter tuple for said first hyperparameter tuple;
the third point is based on a second hyperparameter tuple of the first subset that has a second best score;
the fourth point is based on said colinear hyperparameter tuple for said second hyperparameter tuple.

31. The one or more non-transitory computer-readable media of claim 30 wherein narrowing the current value range of the particular hyperparameter is further based on a particular point of the first line.

32. The one or more non-transitory computer-readable media of claim 31 wherein said particular point is one selected from the group consisting of: said first point and said second point.

33. The one or more non-transitory computer-readable media of claim 31 wherein based on an intersection point comprises based on a point that is between the intersection point and said third point.

34. The one or more non-transitory computer-readable media of claim 23 wherein:

said configuring based on the current value ranges of the plurality of hyperparameters comprises configuring based on a plurality of greedy values;

each greedy value of the plurality of greedy values belongs to a different hyperparameter of the plurality of hyperparameters;

each greedy value of the plurality of greedy values is calculated by a gradient ascent based on the value that belongs to said different hyperparameter in a hyperparameter tuple having the best of all scores.

35. The one or more non-transitory computer-readable media of claim 23 wherein said constant value initially comprises one selected from the group consisting of a maximum value of said current value range and a minimum value of said current value range.

36. The one or more non-transitory computer-readable media of claim 23 wherein said calculating a score for each hyperparameter tuple comprises simultaneously calculating scores for multiple hyperparameter tuples.

37. The one or more non-transitory computer-readable media of claim 36 wherein a count of tuples in said plurality of hyperparameter tuples is based on a count of processors.

38. The one or more non-transitory computer-readable media of claim 23 wherein said score based on the hyperparameter tuple comprises said score based on training said machine learning algorithm that is configured with the hyperparameter tuple.

39. The one or more non-transitory computer-readable media of claim 38 wherein said score is based on at least one selected from the group consisting of:
   fitness of said machine learning algorithm during or after said training, and
   time spent during said training.

40. The one or more non-transitory computer-readable media of claim 38 wherein said training is based on cross-validation comprising folds.

41. The one or more non-transitory computer-readable media of claim 40 wherein at least one selected from the group consisting of:
   said score is based on an average score of said folds,
   said folds consist of five folds, and
   said folds are stratified.

42. The one or more non-transitory computer-readable media of claim 23 wherein said score is at least one selected from the group consisting of: a classification score, an F1 score, and a score based on a loss metric.

43. The one or more non-transitory computer-readable media of claim 23 wherein calculating said score based on said hyperparameter tuple comprises:
   using said hyperparameter tuple as a lookup key for retrieving a known score;
   using the known score as said score if the known score is retrieved;
   otherwise, calculating said score and associating said lookup key with said score.

44. The one or more non-transitory computer-readable media of claim 23 wherein said sequence of epochs for said particular hyperparameter terminates upon an occurrence of at least one selected from the group consisting of:
   the first line does not intersect the second line,
   a width of the current value range of the particular hyperparameter does not exceed a first threshold, and
   said intersection point indicates a value for the particular hyperparameter that is not within the current value range of the particular hyperparameter.

\* \* \* \* \*

UNITED STATES PATENT AND TRADEMARK OFFICE
CERTIFICATE OF CORRECTION

PATENT NO. : 11,176,487 B2
APPLICATION NO. : 15/885515
DATED : November 16, 2021
INVENTOR(S) : Varadarajan et al.

It is certified that error appears in the above-identified patent and that said Letters Patent is hereby corrected as shown below:

On the Title Page

On page 2, Column 2, under Other Publications, Line 14, delete "Applicationsm" and insert -- Applications --, therefor.

On page 2, Column 2, under Other Publications, Line 31, delete ""E ☐ icient" and insert -- "Efficient --, therefor.

On page 2, Column 2, under Other Publications, Line 33, delete "Artifical" and insert -- Artificial --, therefor.

On page 3, Column 1, under Other Publications, Line 34, delete "Sequwnrial" and insert -- Sequential --, therefor.

On page 3, Column 1, under Other Publications, Line 35, delete "Communicaitons" and insert -- Communications --, therefor.

On page 3, Column 1, under Other Publications, Line 59, delete "Nural" and insert -- Neural --, therefor.

On page 3, Column 1, under Other Publications, Line 61, delete ""NeuralNetworks" and insert -- "Neural Networks --, therefor.

On page 3, Column 1, under Other Publications, Line 62, delete "Overviewof" and insert -- Overview of --, therefor.

On page 3, Column 2, under Other Publications, Line 70, delete "Problemd" and insert -- Problem --, therefor.

Signed and Sealed this
Twenty-eighth Day of June, 2022

Katherine Kelly Vidal
*Director of the United States Patent and Trademark Office*

CERTIFICATE OF CORRECTION (continued)
U.S. Pat. No. 11,176,487 B2

On page 4, Column 1, under Other Publications, Line 39, delete ""Unupervised" and insert -- "Unsupervised --, therefor.

On page 4, Column 2, under Other Publications, Line 18, delete "Batlo" and insert -- Batllo --, therefor.

On page 4, Column 2, under Other Publications, Line 30, delete "Algotithm" and insert -- Algorithm --, therefor.

On page 4, Column 2, under Other Publications, Line 41, delete "Lage Traning" and insert -- Large Training --, therefor.

On page 4, Column 2, under Other Publications, Line 48, delete "Performace"," and insert -- Performance", --, therefor.

On page 4, Column 2, under Other Publications, Line 72, delete "fro" and insert -- for --, therefor.

On page 5, Column 1, under Other Publications, Line 14, delete "Machinelearning," and insert -- Machine learning, --, therefor.

In the Drawings

On sheet 8 of 8, in FIG. 8, under Reference Numeral 830, Line 1, delete "( VMM)" and insert -- (VMM) --, therefor.

In the Specification

In Column 5, Line 30, delete "rang" and insert -- range --, therefor.

In the Claims

In Column 24, Line 15, in Claim 15, delete "claim 1" and insert -- claim 14 --, therefor.